United States Patent
Volfson et al.

(10) Patent No.: US 12,345,505 B2
(45) Date of Patent: *Jul. 1, 2025

(54) SINGLE APERTURE LASER RANGE FINDER

(71) Applicant: Torrey Pines Logic, Inc., San Diego, CA (US)

(72) Inventors: Leo Volfson, San Diego, CA (US); Dmitry Starodubov, San Diego, CA (US)

(73) Assignee: Torrey Pines Logic, Inc., San Diego, CA (US)

( * ) Notice: Subject to any disclaimer, the term of this patent is extended or adjusted under 35 U.S.C. 154(b) by 253 days.

This patent is subject to a terminal disclaimer.

(21) Appl. No.: 18/123,759

(22) Filed: Mar. 20, 2023

(65) Prior Publication Data

US 2023/0243621 A1  Aug. 3, 2023

Related U.S. Application Data

(63) Continuation of application No. 15/545,210, filed as application No. PCT/US2016/014147 on Jan. 20, 2016, now Pat. No. 11,609,069.

(Continued)

(51) Int. Cl.
*G01S 17/08*   (2006.01)
*F41G 3/06*   (2006.01)
(Continued)

(52) U.S. Cl.
CPC ............. *F41G 3/06* (2013.01); *G01S 7/4812* (2013.01); *G01S 7/4815* (2013.01); *G01S 7/499* (2013.01); *G01S 17/08* (2013.01)

(58) Field of Classification Search
None
See application file for complete search history.

(56) References Cited

U.S. PATENT DOCUMENTS 4,042,822 A   8/1977   Brandewie et al.
4,447,149 A   5/1984   Marcus et al.
(Continued)

FOREIGN PATENT DOCUMENTS

CN   1641339         7/2005
CN   1683940 A      10/2005
(Continued)

OTHER PUBLICATIONS

Office Action in Chinese Appln. No. 202010189000.6, mailed Jun. 1, 2024, 24 pages (Machine Translation).

(Continued)

*Primary Examiner* — Luke D Ratcliffe
(74) *Attorney, Agent, or Firm* — Fish & Richardson P.C.

(57) ABSTRACT

The present disclosure describes a single aperture laser range finder (SALRF). In an implementation, the single aperture laser range finder includes a beam extender including an aperture and an input aperture lens. A matching lens collimates light emitted from an emitter element associated with a single aperture optical circulator and received by the beam extender, respectively. A single aperture optical circulator has an emitter channel associated with the emitter element and a detector channel associated with a detector element. The emitter channel and the detector channel merge together at an input/output aperture. A light gating mechanism is configured to permit received light to enter the detector channel and to prevent the received light from entering the emitter channel. The SALRF has an electronics end cap.

11 Claims, 20 Drawing Sheets

Related U.S. Application Data

(60) Provisional application No. 62/150,229, filed on Apr. 20, 2015, provisional application No. 62/105,273, filed on Jan. 20, 2015.

(51) Int. Cl.
*G01S 7/481* (2006.01)
*G01S 7/499* (2006.01)

(56) References Cited

U.S. PATENT DOCUMENTS

| | | | |
|---|---|---|---|
| 4,511,248 | A | 4/1985 | Abbas |
| 5,110,207 | A | 5/1992 | Harris |
| 6,018,604 | A | 1/2000 | Ja |
| 6,091,905 | A | 7/2000 | Yajav |
| 6,111,999 | A | 8/2000 | Espindola et al. |
| 6,359,681 | B1 | 3/2002 | Housand et al. |
| 6,545,749 | B1 | 4/2003 | Andersson |
| 2002/0109829 | A1 | 8/2002 | Hayes |
| 2003/0174315 | A1 | 9/2003 | Byren et al. |
| 2005/0200831 | A1* | 9/2005 | Staley, III ............. G01S 7/4812 356/5.11 |
| 2005/0259991 | A1 | 11/2005 | Dudelzak et al. |
| 2006/0232763 | A1* | 10/2006 | Jokinen ................. G01S 7/499 356/5.1 |
| 2007/0280626 | A1 | 12/2007 | Haddock et al. |
| 2009/0128798 | A1 | 5/2009 | Danziger |
| 2011/0032509 | A1 | 2/2011 | Bridges |
| 2011/0121159 | A1 | 5/2011 | Mourar et al. |
| 2014/0026461 | A1 | 1/2014 | Dakin et al. |
| 2014/0049810 | A1 | 2/2014 | McComb et al. |
| 2014/0070080 | A1 | 3/2014 | Ruh |
| 2014/0241731 | A1* | 8/2014 | Peach .................... H04B 10/11 398/139 |
| 2014/0319215 | A1* | 10/2014 | Farca .................... H04N 7/183 235/404 |

FOREIGN PATENT DOCUMENTS

| | | |
|---|---|---|
| CN | 101131826 | 2/2008 |
| CN | 201035148 Y | 3/2008 |
| CN | 101405613 A | 4/2009 |
| CN | 102636151 A | 8/2012 |
| CN | 202649466 U | 1/2013 |
| CN | 103649673 | 3/2014 |
| CN | 203587049 U | 5/2014 |
| CN | 104166142 | 11/2014 |
| EP | 2530488 | 12/2012 |
| JP | 2014-048162 | 3/2014 |
| RU | 2135954 | 8/1999 |
| WO | WO2013165499 | 11/2013 |

OTHER PUBLICATIONS

International Search Report and Written Opinion of the International Searching Authority issued in International Application No. PCT/US20116/014147 on Apr. 21, 2016; 9 pages.

Grübl, European Search Report in European Application No. EP16740683, dated Nov. 15, 2018; 10 pages.

Sun, First Office Action in Chinese Application No. 201680017185.4, Nov. 21, 2018; 10 pages. (with English translation).

* cited by examiner

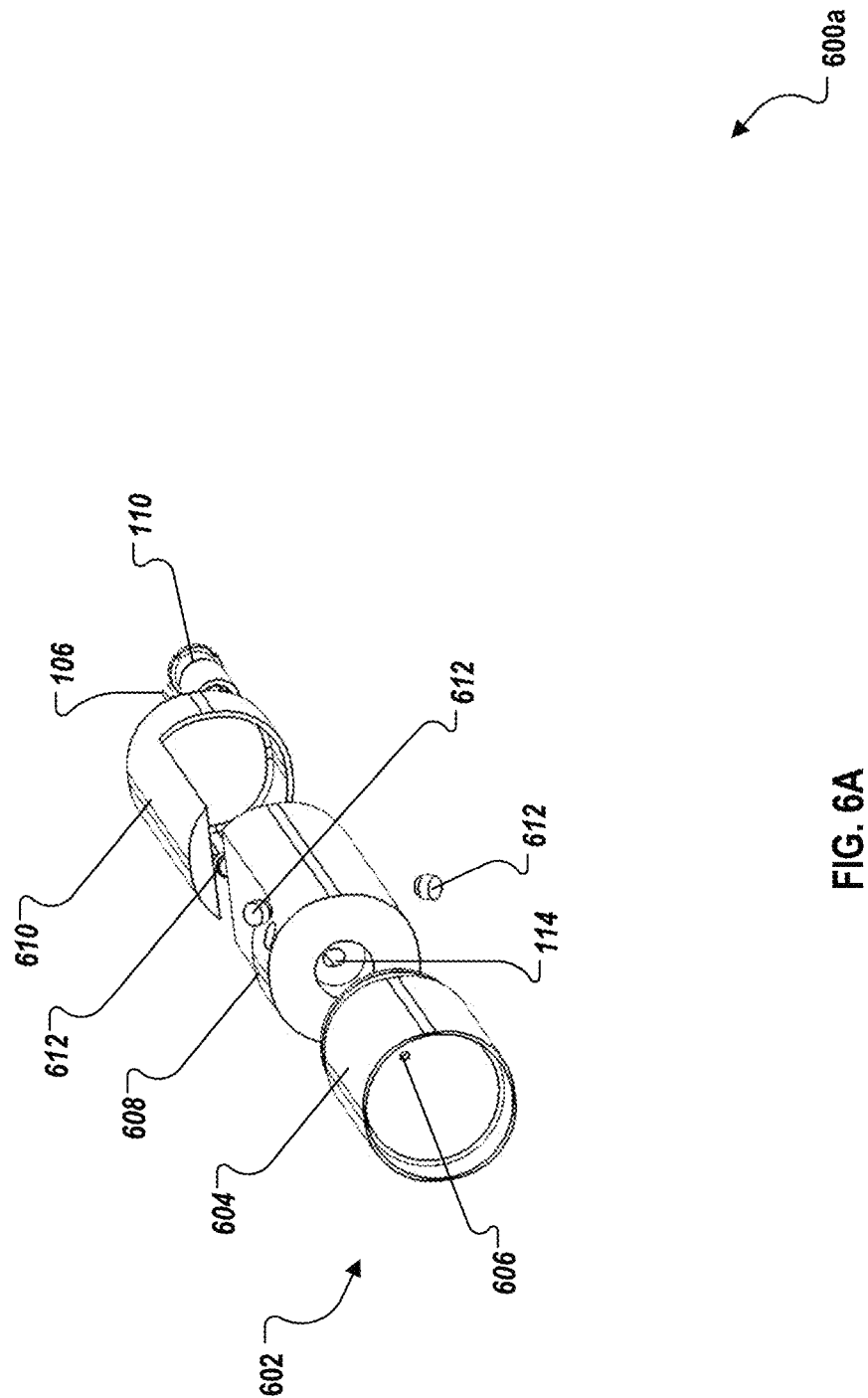

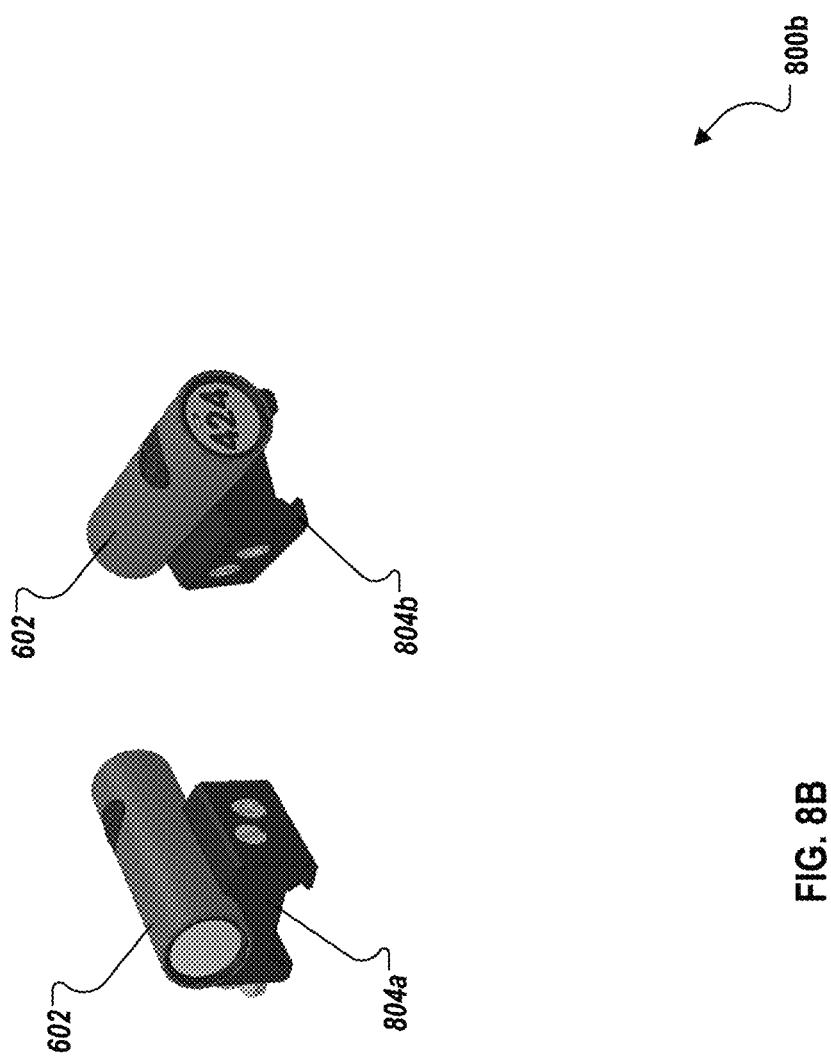

SINGLE APERTURE LASER RANGE FINDER

PRIORITY CLAIM

This application is a continuation of U.S. patent application Ser. No. 15/545,210, filed on Jul. 20, 2017, which is a U.S. national stage under 35 USC ０ 371 of International PCT Application Number PCT/US2016/014147, filed on Jan. 20, 2016, which application claims priority to U.S. Provisional Application No. 62/105,273, entitled "SINGLE APERTURE LASER RANGE FINDER," filed on Jan. 20, 2015 and U.S. Provisional Application No. 62/150,229, entitled "EYE SAFE SINGLE APERTURE LASER RADAR," filed on Apr. 20, 2015. The entire contents of each of the foregoing applications are incorporated herein by reference.

BACKGROUND

Conventional optical circulators used in optical devices typically require multiple ports (e.g., three or four ports acting as input and/or output ports) to receive/guide light. For example, received light entering any port can be transmitted to a separately configured output port associated with the receiving port. In an optical device solution where a single aperture/port is to be provided for receiving/transmitting light (e.g., a single aperture laser range finder (SALRF)), conventional optical circulators are unnecessarily complex, oversized, expensive, and/or inefficient to use. For example, engineering a SALRF to incorporate a conventional optical circulator may require design compromises, use of optical fiber and associated interfacing optical components, and excessive engineering effort, time, and/or monetary resources to; if possible, interface the conventional optical circulator with the SALRF.

SUMMARY

A first implementation of a single aperture laser range finder (SALRF) includes a beam extender including an aperture and an input aperture lens; a matching lens that collimates light emitted from an emitter element associated with a single aperture optical circulator and received by the beam extender, respectively; the single aperture optical circulator, wherein an emitter channel associated with the emitter element and a detector channel associated with a detector element merge together at an input/output aperture, and wherein a light gating mechanism is configured to permit received light to enter the detector channel but to prevent the received light from entering the emitter channel; and an electronics end cap.

The first or any implementations below may include one or more of the following features: wherein the detector element is a quadrant; comprising an additional detector element and optical component within the single aperture optical circulator to direct the received light to either the detector element or the additional detector element; comprising an additional emitter element and optical component within the single aperture optical circulator to merge the emitted light prior to entry into the light gating mechanism; or comprising an additional light gating mechanism following the input/output aperture in order to direct the light emitted from the emitter element and to direct the received light into the input/output aperture.

A second implementation of a single aperture laser range finder (SALRF) includes a beam extender including an aperture and an input aperture lens; a single aperture optical circulator, wherein an emitter channel associated with an emitter element and carrying light emitted by the emitter element and a detector channel associated with a detector element merge together at an input/output aperture, and wherein a light gating mechanism is configured to permit received light to enter the detector channel but to prevent the received light from entering the emitter channel; and a plurality of additional light gating mechanisms following the input/output aperture in order to direct the light emitted from the emitter element and to direct the received light into the input/output aperture.

The second or any implementations above or below may include one or more of the following features: wherein the detector element is a quadrant photodetector; comprising an additional detector element and optical component within the single aperture optical circulator to direct the received light to either the detector element or the additional detector element; comprising an additional emitter element and optical component within the single aperture optical circulator to merge the emitted light prior to entry into the light gating mechanism; or comprising an addressable selection system for individually activating or deactivating each of the plurality of additional light gating mechanisms.

A third implementation of a single aperture laser range finder (SALRF) includes a method for emitting light from a single aperture optical circulator; collimating the emitted light using a matching lens; extending the collimated light using a beam extender; projecting the extended light toward a target; receiving reflected light at the beam extender; reducing the reflected light for transmission to the matching lens; collimating the reduced light for entry into and detection by a detector associated with the single aperture optical circulator; and displaying data associated with detected light.

The third or any implementations above or below may include one or more of the following features: wherein the detector element is a quadrant photodetector; wherein the single aperture optical circulator comprises an additional detector element and optical component within the single aperture optical circulator to direct the received light to either the detector element or the additional detector element; wherein the single aperture optical circulator comprises an additional emitter element and optical component within the single aperture optical circulator to merge the emitted light prior to entry into the light gating mechanism; or comprising directing the light emitted from the emitter element and directing the received light into the input/output aperture with an additional light gating mechanism following the input/output aperture.

Particular implementations of this aspect include corresponding computer systems, apparatuses, and computer programs recorded on one or more computer storage devices, each configured to perform actions of methods associated with described functionality. A system of one or more computers can be configured to perform particular operations or actions by virtue of having software, firmware, hardware, or a combination of software, firmware, or hardware installed on the system that in operation causes the system to perform the actions. One or more computer programs can be configured to perform particular operations or actions by virtue of including instructions that, when executed by data processing apparatus, cause the apparatus to perform the actions.

Implementations of these and other aspects may include one or more of the following advantages. First, an optical circulator for use with single aperture optical devices (SAOC) provides an inexpensive low-loss optical combiner for use with single aperture optical devices. Second, the SAOC can be manufactured into a compact and lightweight package to support multiple single aperture optical device solutions (e.g., a SALRF). Third, in some implementations, the SAOC's emission/detection characteristics can be determined by varying a replaceable emitter component and/or a detector component. In fact, in some particular implementations, the SAOC can be a relatively "drop-in" solution allowing users an option to rapidly change the optical/performance characteristics of the single aperture optical device based on, for example, a needed use or repair. For an additional example, in an implementation where an SAOC is used with a SALRF, the maximum range detection capability, the range-finding laser type, and/or the reflected laser detection characteristics could be varied by simply replacing the entire SAOC or the emitter and/or detector associated with the SAOC. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

FIB. 5B is a block diagram of an example implementation of a non-reciprocal optical element (NROE) used in the above-described optical circulator for use with an SAOC, according to an implementation.

FIG. 6A is an exploded diagram of an example SALRF in a front perspective view, according to an implementation.

Figure 6B:
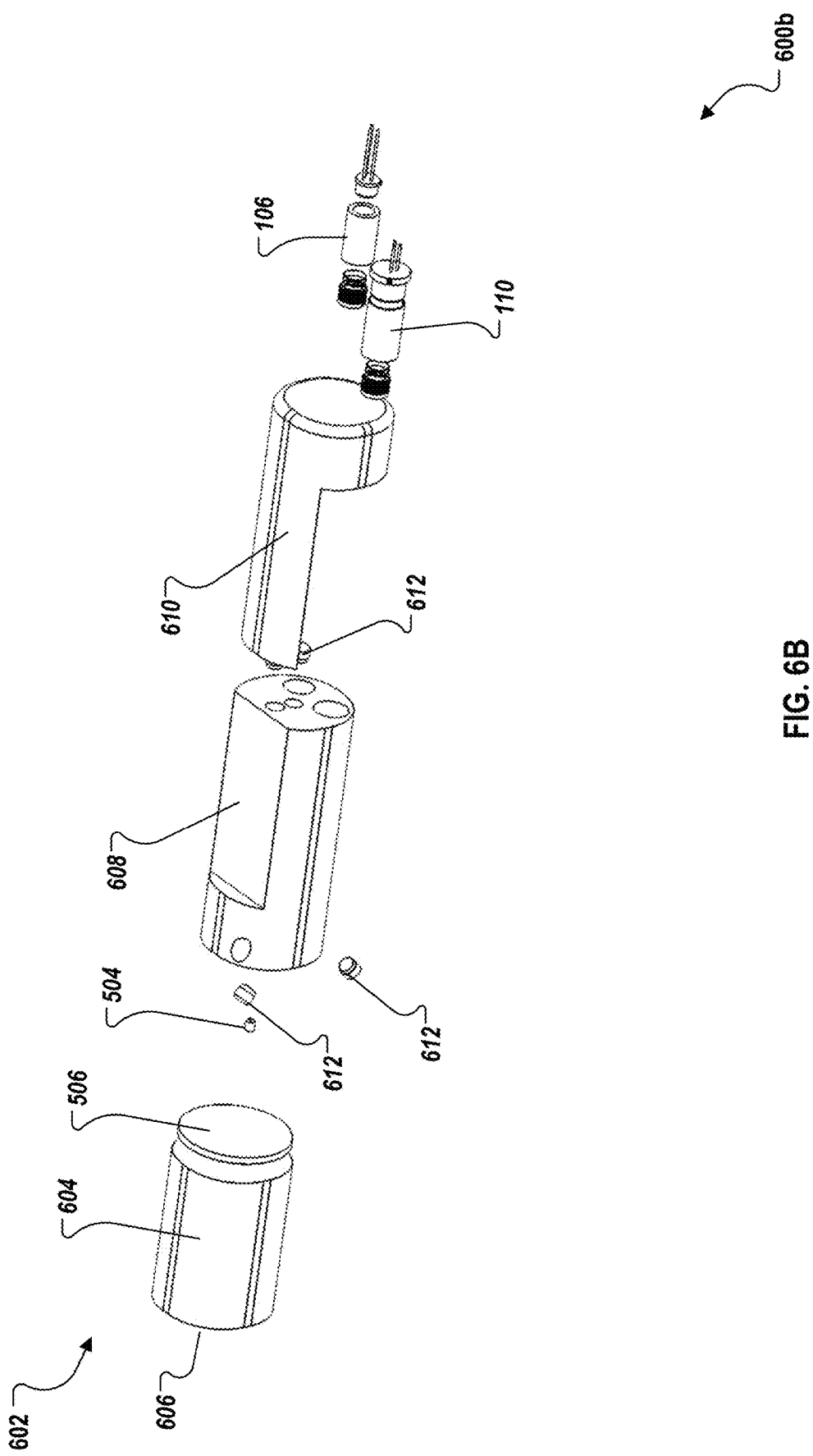

FIG. 6B is an exploded diagram of the example SALRF of FIG. 6A in a rear perspective view, according to an implementation.

Figure 7A:
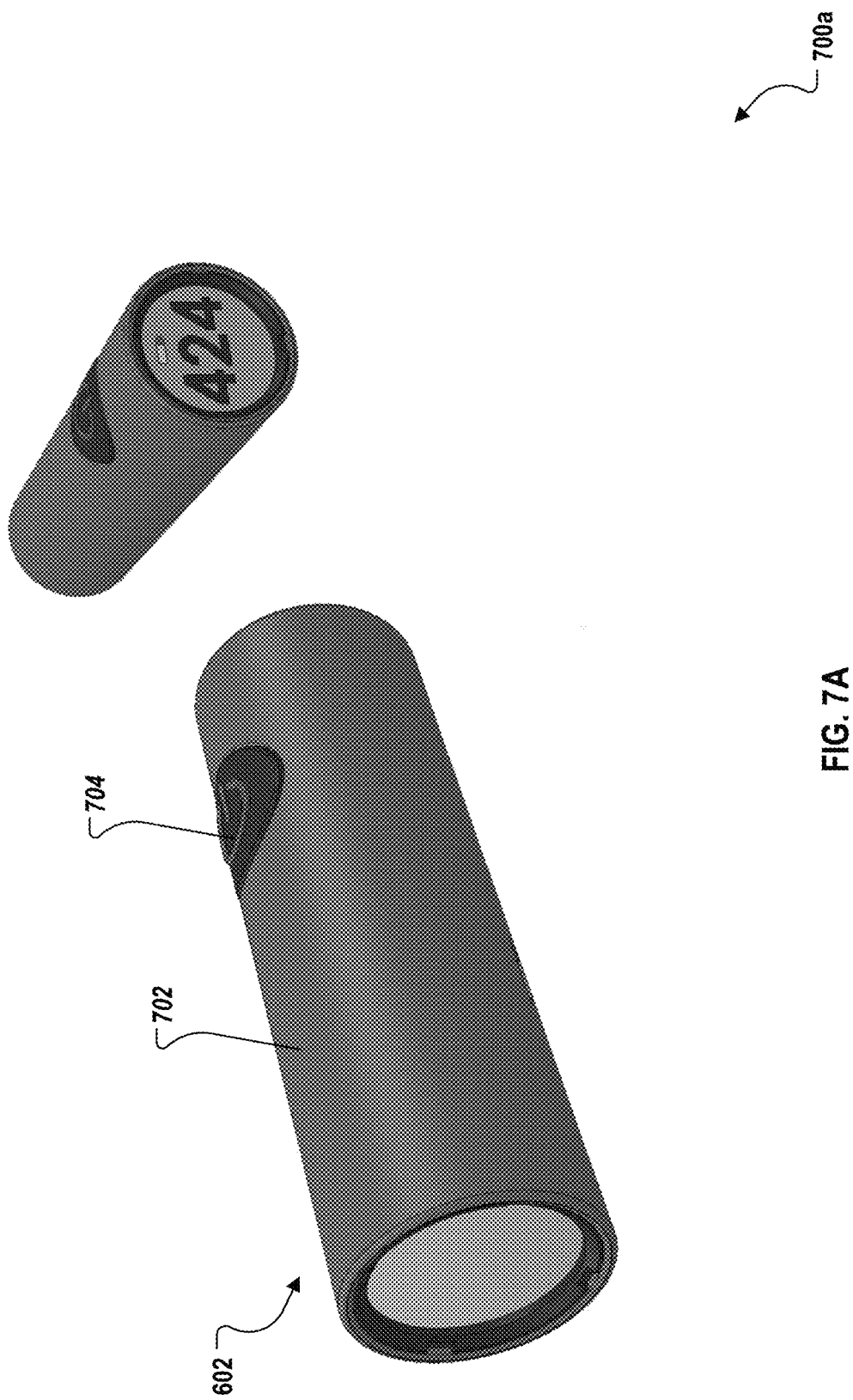
Figure 7B:
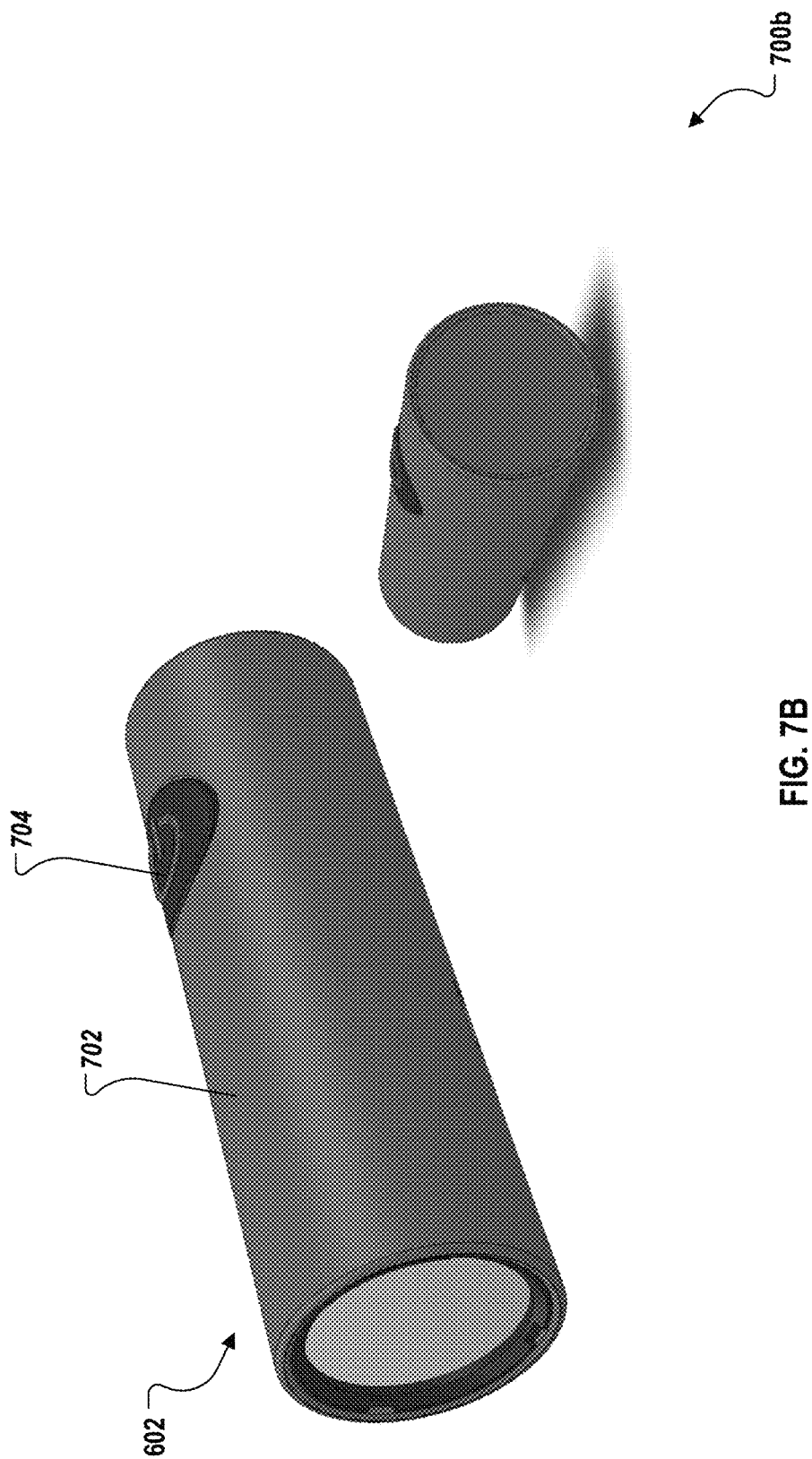

FIGS. 7A & 7B illustrate example implementations of an assembled SALRF of FIGS. 6A-6B, according to an implementation.

Figure 8A:
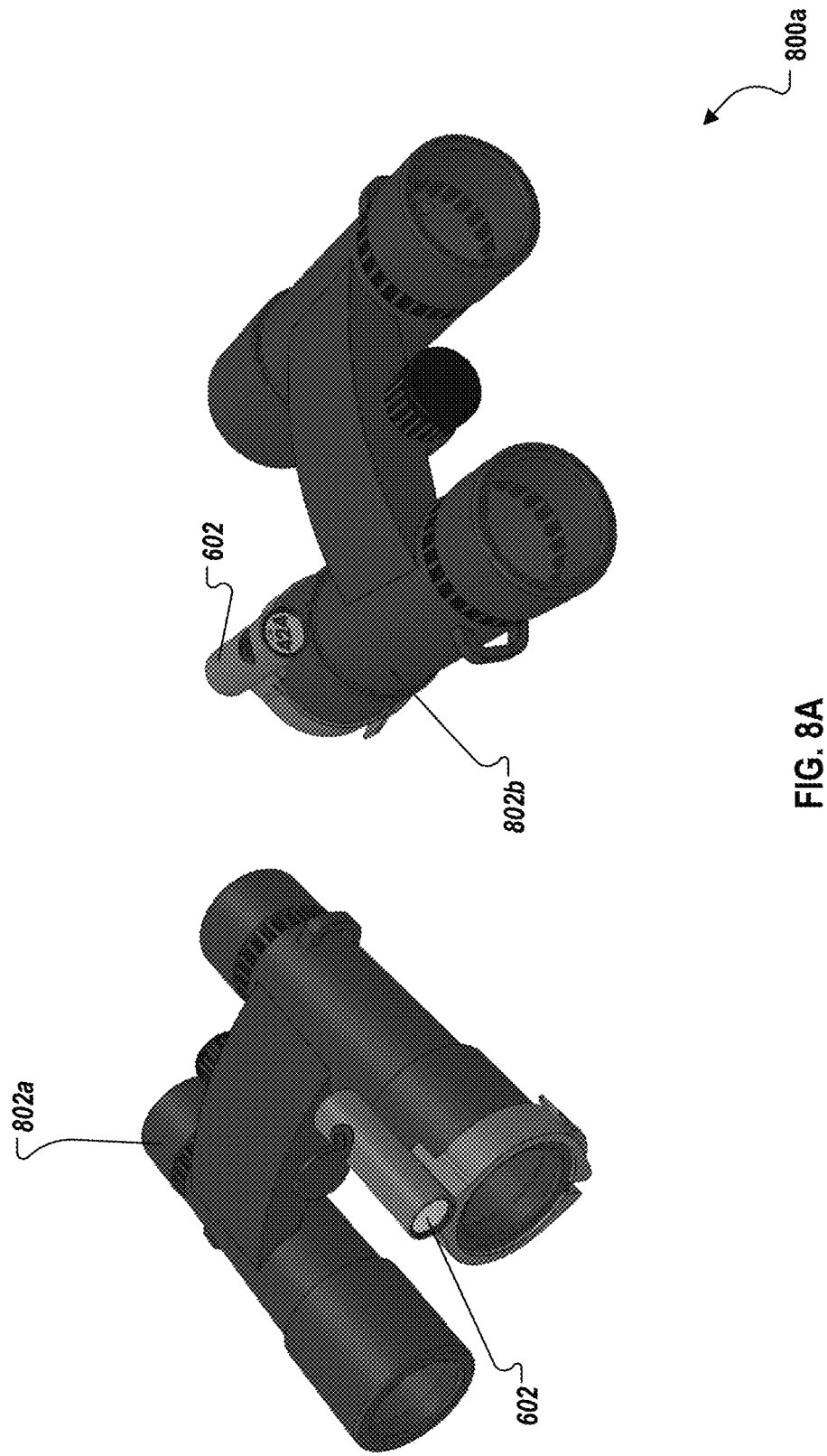

FIGS. 8A & 8B illustrate example mounting options for the SALRF of FIGS. 6A-6B and 7, according to an implementation.

Figure 9:
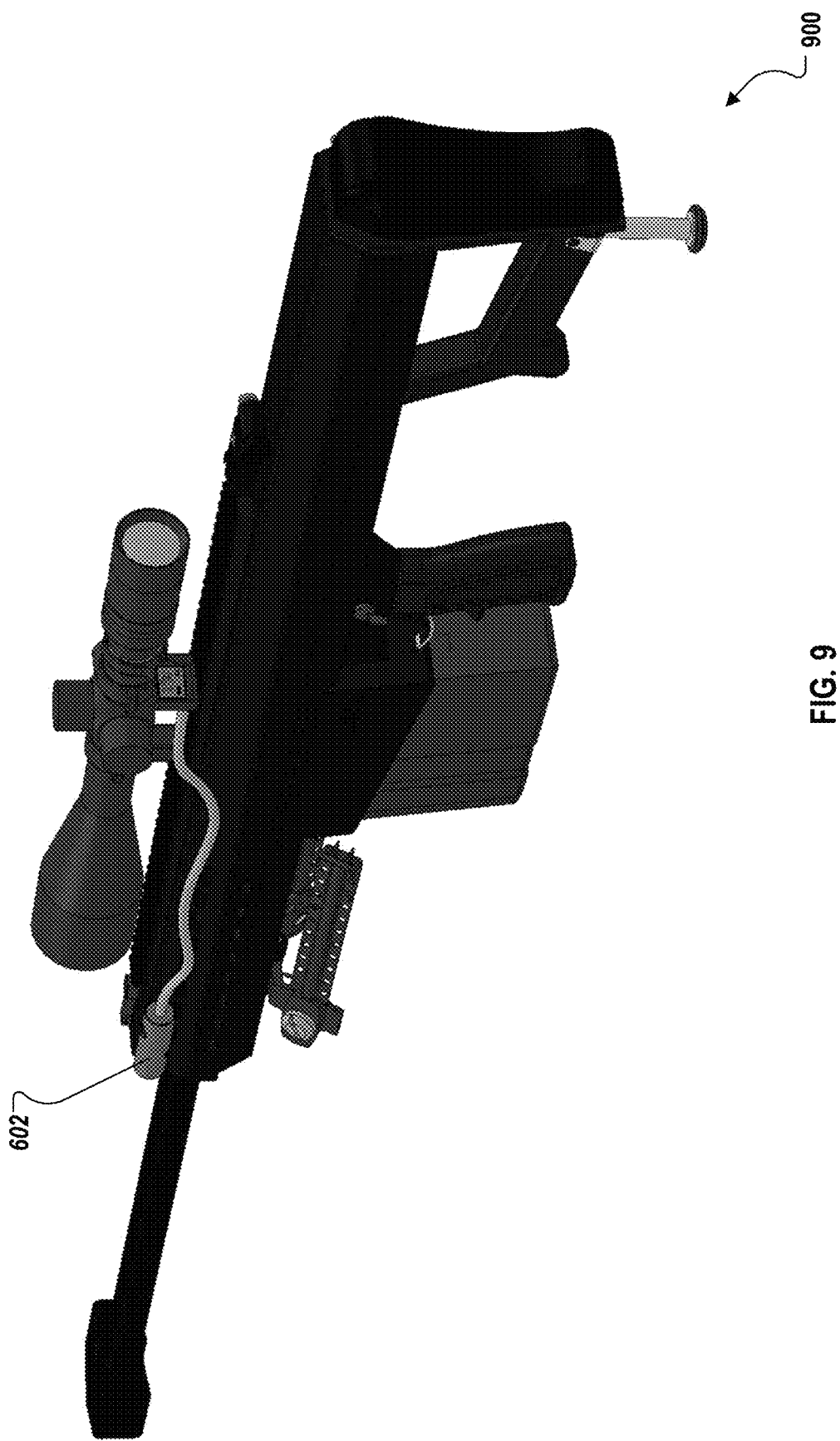

FIG. 9 is an illustration of the SALRF of FIGS. 6A-6B and 7-8 mounted to a firearm with a display linked to the SALRF with a data cable, according to an implementation.

Figure 10:
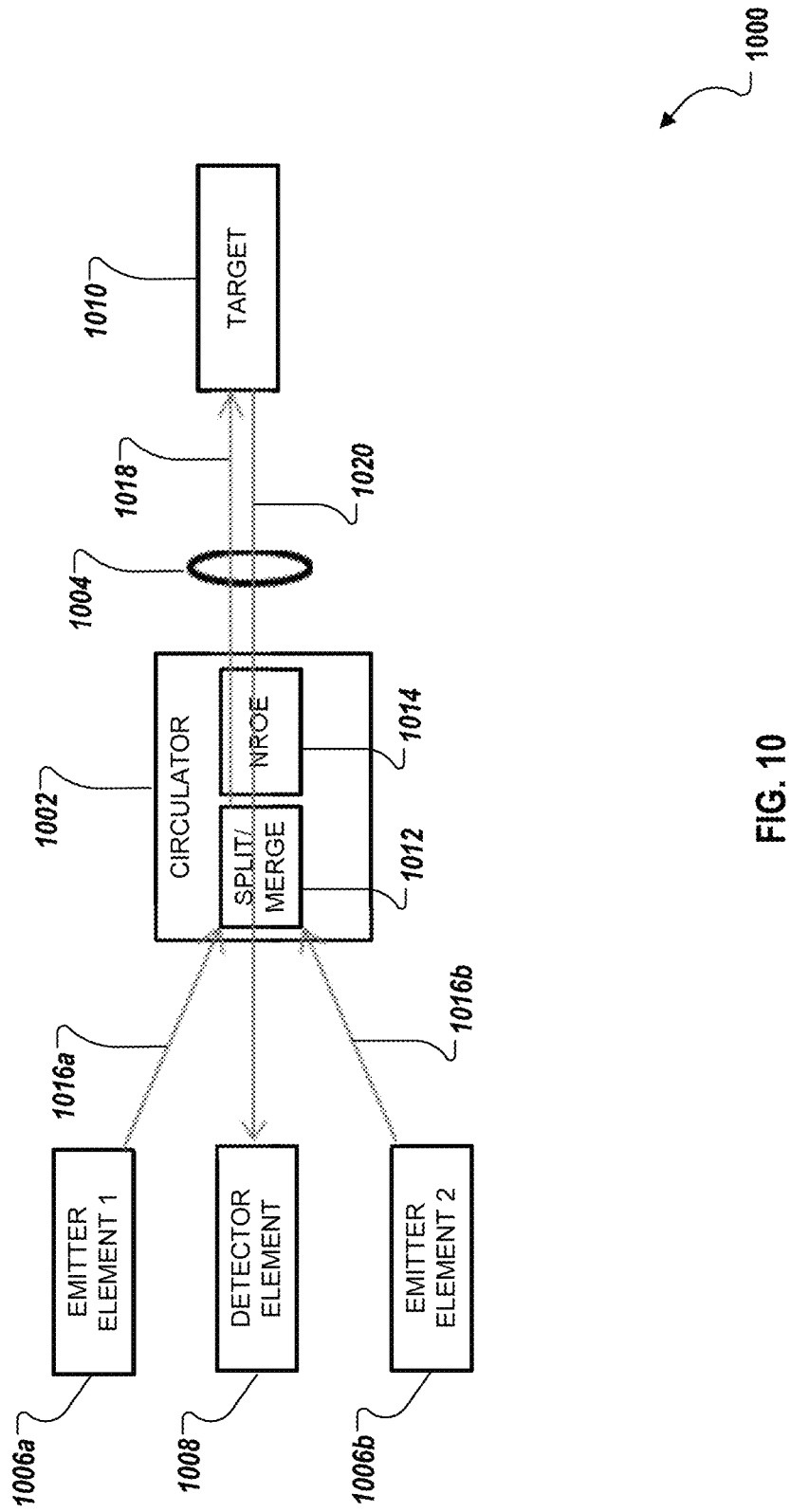

FIG. 10 is a block diagram of a multi-emitter SALRF, according to an implementation.

Figure 11:
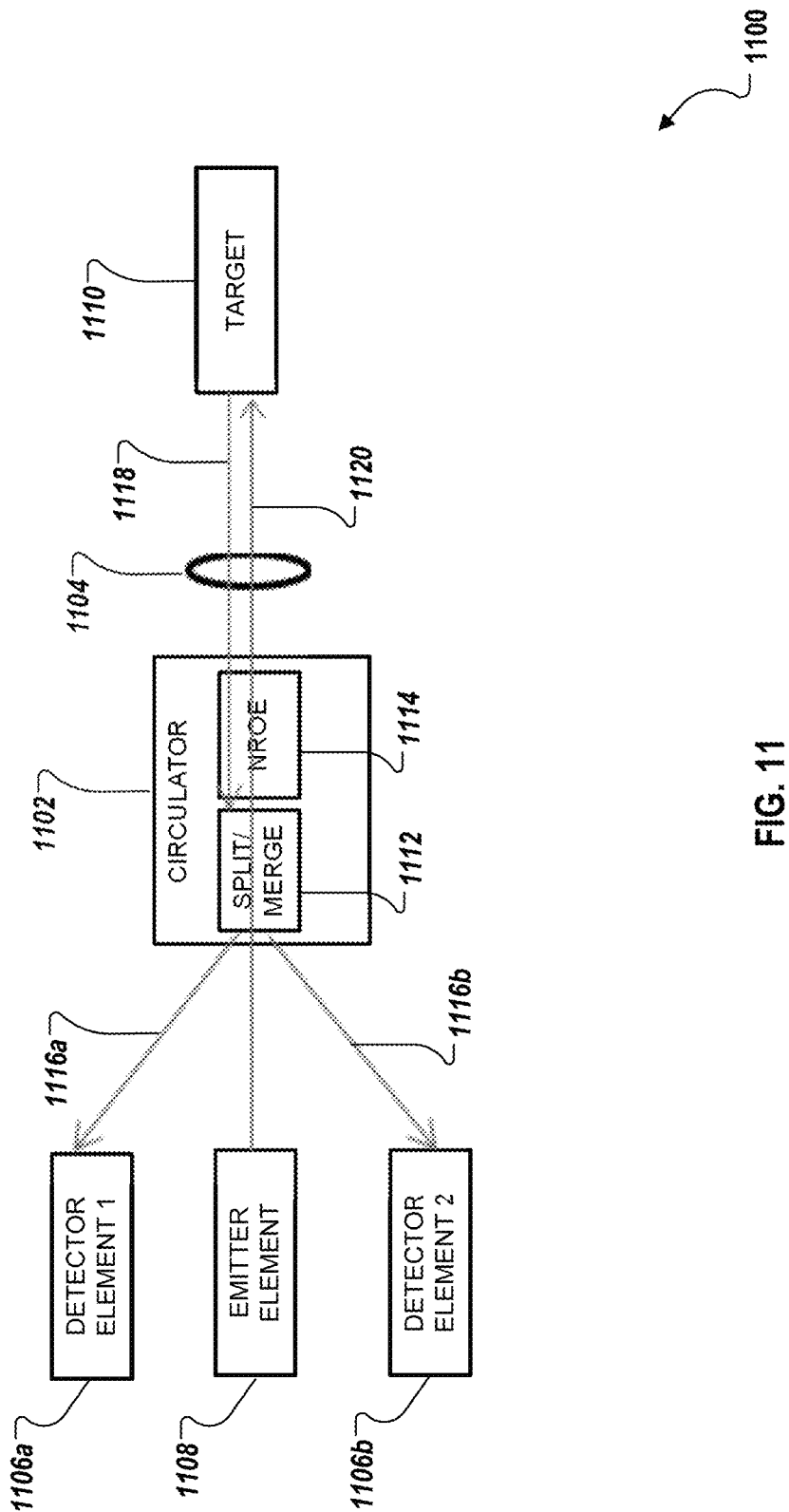

FIG. 11 is a block diagram of a multi-detector SALRF, according to an implementation.

Figure 12:
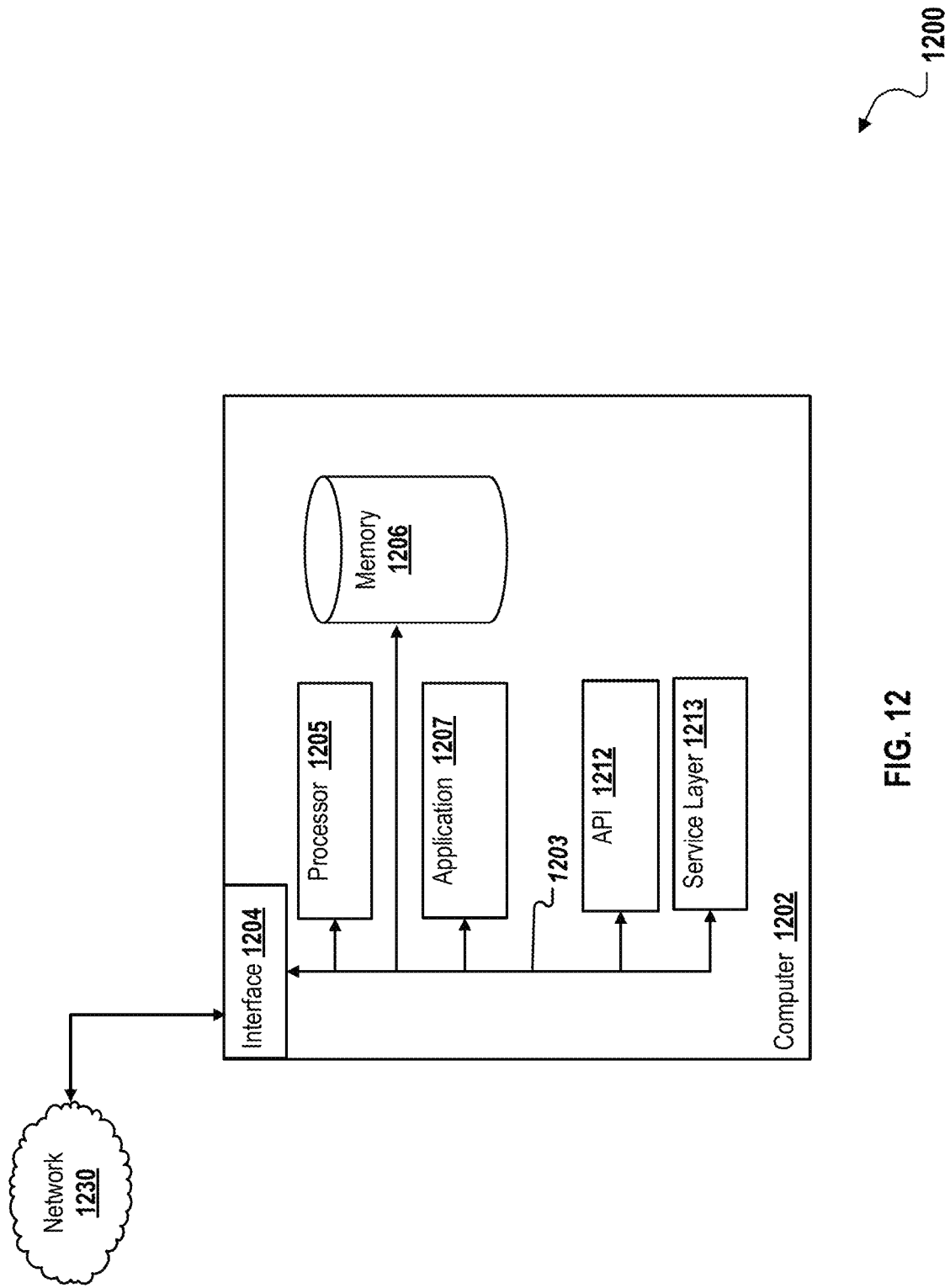

FIG. 12 is a block diagram of an exemplary computer system used to provide functionality related to the described SALRF, according to an implementation.

Like reference numbers and designations in the various drawings indicate like elements.

DETAILED DESCRIPTION

The disclosure relates to a single aperture laser range finder (SALRF). The details of one or more implementations of the subject matter of this specification are set forth in the following description and the accompanying drawings to enable a person of ordinary skill in the art to practice the disclosed subject matter. Other features, aspects, and advantages of the subject matter will become apparent from the description, the drawings, and the claims.

An optical circulator is a non-reciprocal optical component that can be used to separate electromagnetic radiation (e.g., light/optical signals) that travels in opposite directions. Optical circulators are considered non-reciprocal optics in that changes in the properties of light passing through the device are not reversed when the light passes through in the opposite direction. Conventional optical circulators used in optical devices typically require multiple ports (e.g., three or four ports acting as input and/or output ports) to receive/guide light along a channel (e.g., an optical fiber). In a typical implementation, an optical circulator is a three-port device designed and configured in such a way that light entering any port exits from the next. In other words, for example, if light enters port 1, it is emitted from port 2, but if some of the emitted light is reflected back into the circulator through port 2, it does not come out of port 1, but instead is redirected to exit from port 3.

There are a wide variety of optical systems that utilize light propagation for detection of a distance to an objects in the path of emitted light using light returned from the object. Such systems include optical range finders for measuring the distance optically, light detection and ranging (LADAR) systems that use laser illumination for precise measurements of the distance to a desired object, optical time domain reflectometers (OTDRs) that measure the value of light returned from an object versus a distance that the light travels from the light emission source to the object as a function of time.

Most existing optical ranging systems use separate optical paths for the light that is sent to the target and for the light that travels back to the light emission source. The design of these systems require that detector path and source path optics are set and maintained in good alignment across a range of operating conditions in order to operate properly. Some systems are designed with a beam splitter/combiner, such as a 50% reflective mirror or a 50/50 fiber coupler to combine detection and transmission optical paths into a common optical path to the target and back. However this approach loses approximately three-quarters of the light with a double pass through the coupler. Fiber communications systems often use optical circulators for separating transmitted and received optical signals. In this configuration the single optical fiber is used in bi-directional mode with signals travelling in both directions. However, these communication systems use optical fibers to reduce crosstalk between optical paths and cannot be applied to typical optical ranging systems directly typically due to a challenge in efficiently collecting the returned signal back into the optical fiber.

In an optical device solution for performing optical ranging, where a single aperture/port optical ranging system solution is to be provided for receiving/transmitting light, conventional optical circulators are typically unnecessarily complex, oversized, expensive, and/or inefficient to use. For example, engineering a single aperture optical device to incorporate a conventional optical circulator may require design compromises and additional optical components, engineering effort, time, and/or monetary resources to; if possible, interface the conventional optical circulator with the single aperture optical device solution.

This disclosure describes the use of a customized optical isolator—a non-reciprocal optical element (NROE)—in an optical circulator for use with single aperture optical devices (SAOC). In typical implementations, the optical isolator consists of two birefringent wedges and a magneto-optic element (e.g., a magneto-optical garnet) (see FIG. 5B for additional detail) in order to provide functionality related to a SALRF. The selected approach uses the customized optical isolator in a simple/low cost optical circulator design that changes the direction (angle) of the light propagation differently for transmitted and received light signals. The design also allows a combination of two light sources with linear polarization in a 90-degree orientation to each other to be combined into a common output optical path that is shared with a detector path.

Note that in the following figures (FIGS. 1A-1B, 2A-2B, 3A-3B, and 4A-4B) particular components (e.g., an emitter element, a detector element, reflective surfaces, etc.) are not explicitly illustrated but referred to as if they were present in the illustrated example SAOC implementations. In these illustrations, a cavity, hole, cutout, etc. configured in the illustrated SAOC is illustrated where the described components would be installed. Those of ordinary skill in the art should understand the correct placement of an emitter element, a detector element, reflective surfaces, etc. based on the provided description.

Single Emitter/Detector Implementations

Figure 1A:
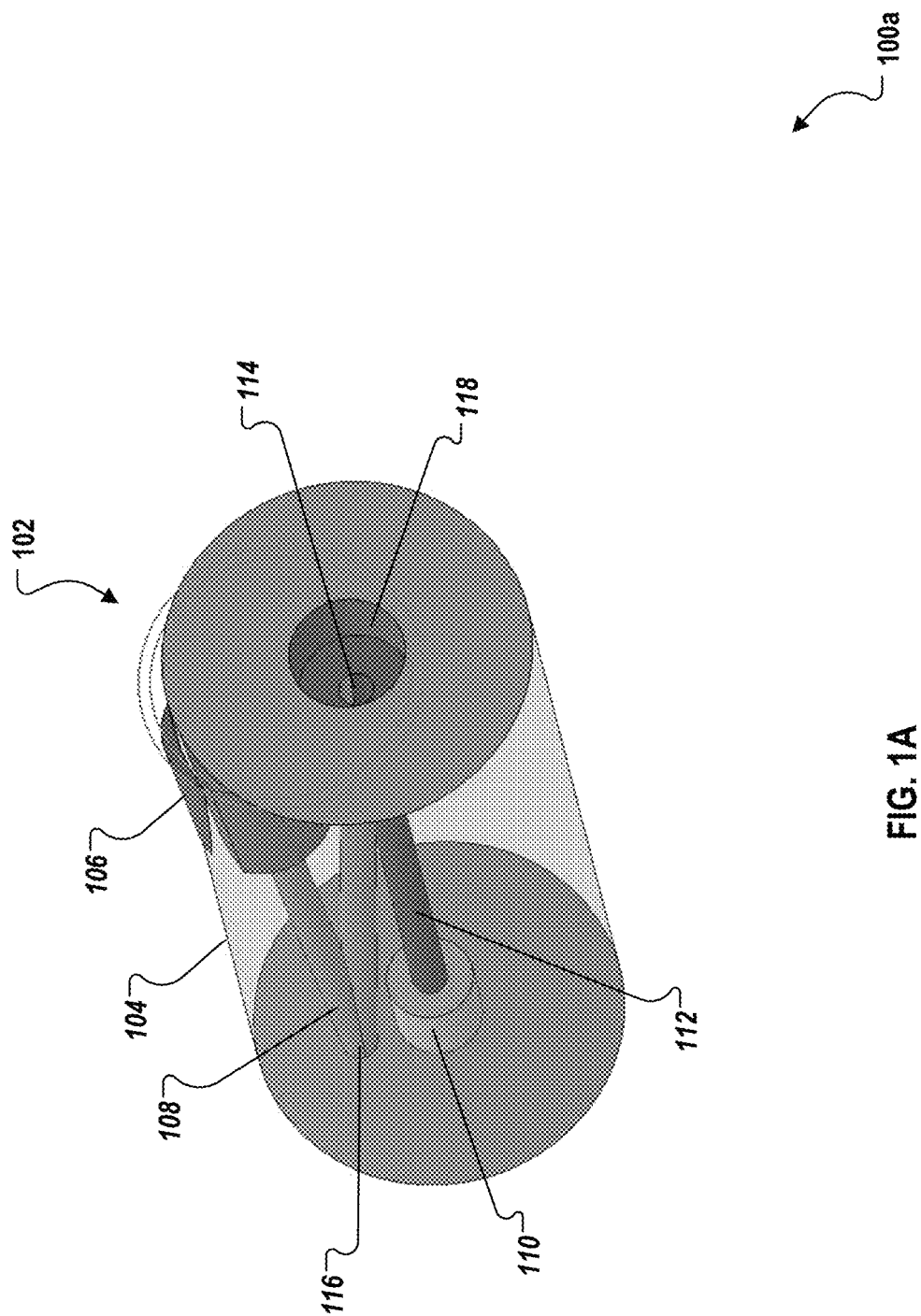
FIG. 1A illustrates a front perspective view of a first example implementation of an optical circulator for use with single aperture optical devices (SAOC) according to an implementation.

FIG. 1A illustrates a front perspective view 100a of a first example implementation (102) of an SAOC according to an implementation. The SAOC 102 includes a housing 104, an emitter element 110, an emitter channel 112 (providing a path from the emitter element 110), a detector element 106, a detector channel 108 (providing a path to the detector element 106), and an input/output aperture 114. The housing 104 is typically configured of a lightweight metal (e.g., aluminum, titanium, etc.). However in some implementations, the housing can be configured of polymers, ceramics, glass, composite materials, and combinations of materials consistent with this disclosure. Note that in typical implementations, no external or internal optical fiber is needed for the operation of the SAOC 102 (or other described SAOC implementations) or to interface with other elements forming a SALRF.

The emitter element 110 is configured to produce/emit light that travels through the emitter channel 112 to emerge and be transmitted from the output aperture 114. In typical implementations, the emitter channel 112 is a hollow structure configured into the housing 104. In some implementations, the channels (both emitter and detector) can be waveguides of different forms (e.g., optical fiber, etc.) In typical implementations, the emitter element 110 emits a laser beam, but other forms of emission consistent with this disclosure are also considered to be within the scope of this disclosure. The type of emitter element 110 can vary depending on a requirement of use. For example, for a SALRF implementation, the emitter element 110 can emit an infrared (IR) or visible (e.g., red or green) laser. In other implementations, such as for law enforcement or military use, the emitter element can emit an ultraviolet (UV) or other type of laser. Any type of laser emitter is considered to be within the scope of this disclosure.

In some implementations, more than one emitter element 110 can be configured to be used with a particular SAOC. For example, each emitter element 110 could have a separate emitter channel 112 or the multiple emitter elements 110 can share an emitter channel. In some implementations, the emitter element 110 can be configured to provide multiple modes, for example a "dual-mode" or "tri-mode", where the emitter element 110 can emit different types and/or intensities of light depending on the particular selected mode.

Note that in the illustrated SAOC 102 implementation, the emitter element 110 is oriented to face to the front of the SAOC 102 (in the illustration, to the right) and is installed within the housing 104 along the longitudinal axis of the SAOC 102. Also note that as the emitter element 110 is pointing to the front, the emitted light can travel a direct route from the emitter element 110 to the input/output aperture 114. In some implementations, the emitter element 110 (and similarly the detector element 106) can be coupled with the housing 104 using threading (not illustrated), adhesives, coating/sealing materials, clips, a twist-type locking mechanism, fasteners, friction, and/or other appropriate means as understood by those of ordinary skill in the art.

In some implementations, the emitted light can leave the single input/output aperture 114 of the SAOC 102, travel to, and be reflected back to be received by the input/output aperture 114. For example, the emitted light can be reflected back to the input/output aperture 114 by an object, such as a target, vehicle, house, person, game animal, etc. Upon returning to the input/output aperture 114, the reflected light enters the input/output aperture 114. In typical implementations, the detector channel 108 is a hollow structure (similar to the emitter channel 112) configured into the housing 104. Although not illustrated, the entering light is not permitted to re-enter and travel back along the emitter channel 112 to enter the emitter element 110.

Figure 5A:
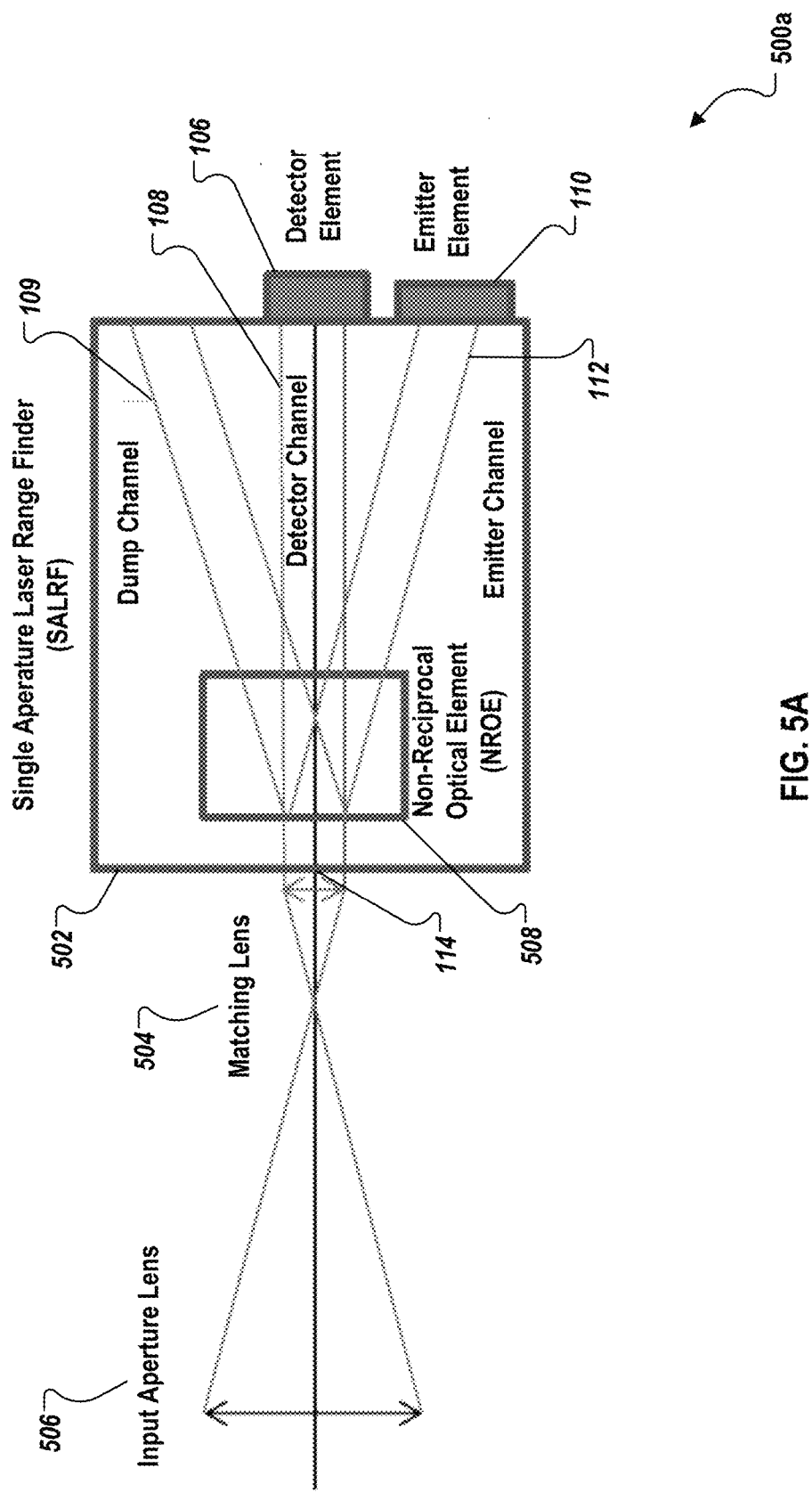
FIG. 5A is a block diagram illustrating an example implementation of a single aperture laser range finder (SALRF), according to an implementation.
Figure 5B:
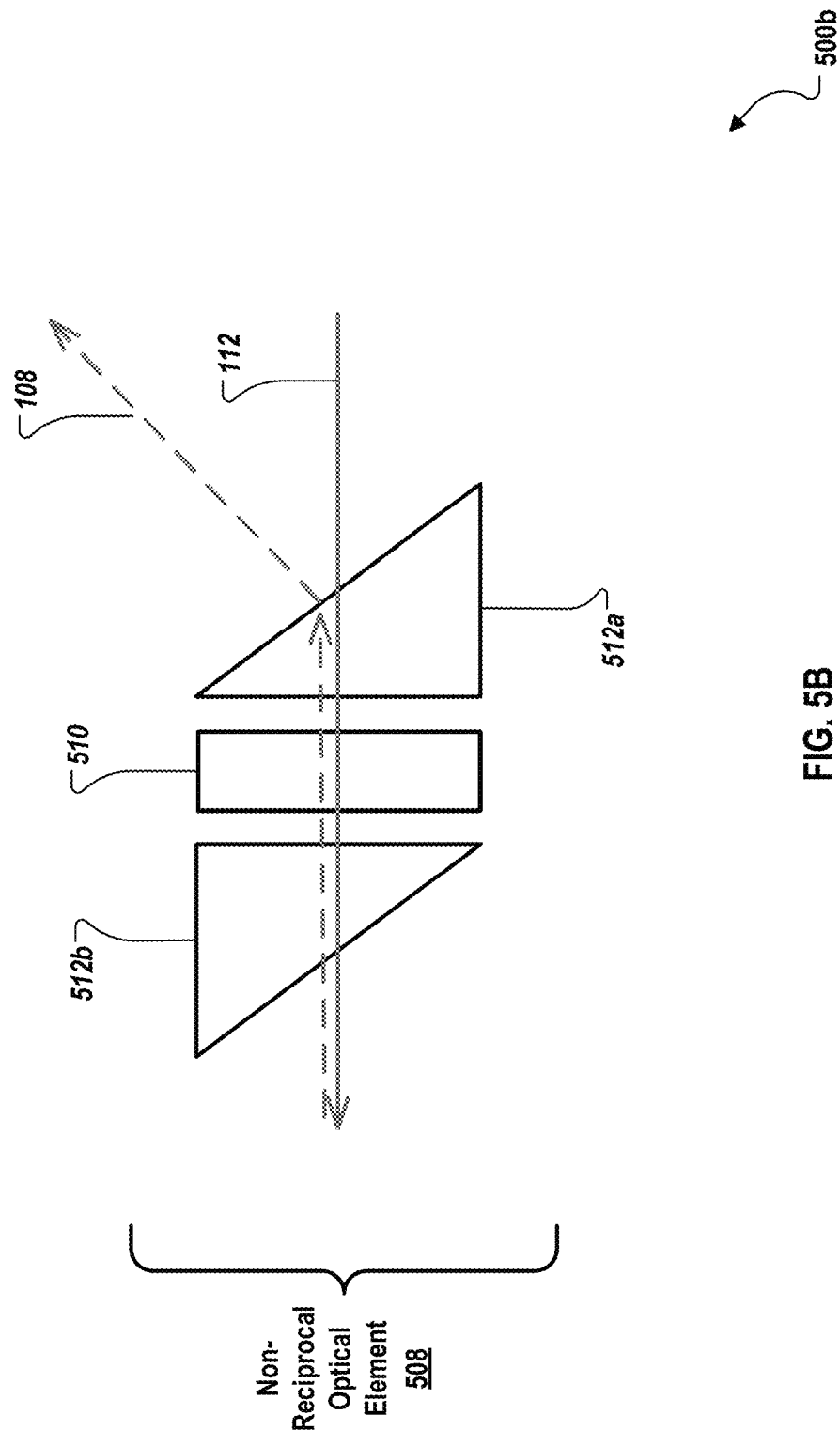

In some implementations, a non-reciprocal optical element (NROE) acting as a light gating mechanism is configured to perform this functionality (see FIGS. 5A & 5B, element 508). For example, in some implementations, the NROE can be a photonic-type crystal operating as a Faraday rotator (either used in a polarized dependent or independent optical circulator) that can be used to guide/influence the propagation of the received light to only enter the detector channel 108 for detection purposes. In effect, the NROE is typically used to form a one-way splitter 112. In other words on output, the NROE can combine light from multiple channels into a single beam, but on return, received light is not split into multiple channels, but guided into a single channel (e.g., the detector channel 108). In other implementations, as will be appreciated by those of ordinary skill in the art, other structures/mechanisms providing similar functionality can be used in place of and/or in conjunction with the NROE.

In the illustrated SAOC 102, the emitter channel 112 and the detector channel 108 are configured to merge at the input/output aperture 114 where the light generated by the emitter element 110 is emitted on-axis out of the input/output aperture 114. In typical implementations, the NROE (e.g., a photonic crystal) is situated in the center of the input/output aperture 114. The NROE is typically surrounded/protected by a material such as glass (e.g., glass wedges), crystal, etc.

In some implementations, a small amount of emitted light can be reflected from the input/output aperture 114 (e.g., by the photonic crystal, a mirror, prism, lens (e.g., a matching lens described below), etc.) back into the SAOC 102. As with the above-described received light, it is not typically desirable to have the reflected light re-enter and travel back along the emitter channel 112 to the emitter element 110. In some implementations, the reflected light can be guided to the detector element 106 through the detector channel 108 to provide a signal used by an optical device incorporating the SAOC 102 to time returned light (e.g., an optical time domain reflectometer, or OTDR). In some implementations, some or all of this reflected light can be guided to a separate dump channel 109 to discard the reflected light (e.g., emitted outside the SAOC 102 using an aperture in the housing 104 or absorbed within the dump channel 109, etc.). In some implementations, the described dump channel 109 can be similar to the emitter channel 112 and/or the detector channel 108 and may take any appropriate path through the SAOC 102 housing. In some implementations, the dump channel 109 can also be coupled with a separate detector element that can provide information to a SALRF (e.g., light timing, light intensity, light temperature, and the like).

The detector element 106 is configured to detect light that travels through the detector channel 108 (e.g., reflected emitted light or returning light originally emitted by the emitter element 110. In some implementations, the detector element 106 can also detect other light apart from light emitted from the emitter element 110. For example, the detector element can be configured to detect light typically associated with one or more types of targeting lasers (dissimilar to the light emitted by the emitter element 110) so that a warning can be generated that a targeting laser is being aimed toward the SAOC 102 (i.e., the user of the SAOC 102).

As described in more detail below, in some implementations, more than one detector element 106 can be configured to be used with a particular SAOC. For example, each detector element 106 could have a separate detector channel 108 or the multiple detector elements 106 can share a detector channel 108. In some implementations, the detector element 106 can be configured to provide multiple modes, for example a "dual-mode" or "tri-mode", where the detector element 106 can detect different types and/or intensities of light depending on the particular selected mode.

Note that in the illustrated SAOC 102 implementation, the detector element 106 is oriented to face to the back of the SAOC 102 (in the illustration, to the left) and is installed (e.g., in a configured "cutout") within the housing 104 at an angle to the longitudinal axis of the SAOC 102 (which is parallel with respect to the emitter channel 112). Also note that as the emitter element 110 is pointing backwards, the emitted light must be reflected forward toward the input/output aperture 114. As such, detector channel 108 includes two segments. In some implementations, the detected light can be reflected using one or more reflective surfaces (e.g., mirrors, prisms, etc.) coupled to the segments of the detector channel 108. For example, in the illustration, a reflective a mirror (e.g., a 45-degree mirror) can be installed at a "bend" (reflective junction) 116 of two different detector channel 108 segments in the detector channel 108 to reflect the emitted light from the input/output aperture 114. In some implementations, the detector channel 108 and/or the emitter channel 112 can be polished to reflect light. In other implementations, the emitter channel 112 and/or the detector channel 108 can be coated with an anti-reflective substance.

In some implementations, the detector element 106 can be a single photodetector (e.g., a photodiode) receiver. In some implementations, the detector element 106 can be divided into a plurality of separate photodetectors in a single receiver (e.g., a quadrant receiver where a the detector element (a single photodiode) is configured as four separate, individually-addressable photodetecting areas (a quadrant photodetector) arranged in a multi-axis configuration and each photodetector separated by a small distance). An example of a quadrant photodetector and its uses can be found in co-pending U.S. patent application Ser. No. 13/870,828, which is hereby incorporated by reference in its entirety.

In some implementations, the housing 104 around the input/output aperture 114 (e.g., surface 118—an indentation, cutout, cavity, etc.) can be configured with a light reflective/absorbing surface to help guide/mitigate received light traveling toward the input/output aperture 114. In some implementations, a lens (not illustrated) can be attached to the housing 114 in front of the input/output aperture to influence, filter, and/or provide other optical functionality related to emitted/received light. For example the described lens could be transparent to IR or UV light but not to the visible spectrum. In some implementations, the lens could be configured of polymers, glass, Germanium (Ge), quartz, AMTIER, barium fluoride, calcium fluoride, sodium chloride, CLEARTRAN, fused silica, silicon, polyethylene, IR transparent ceramics, and/or any other type of substance transparent to light.

Figure 1B:
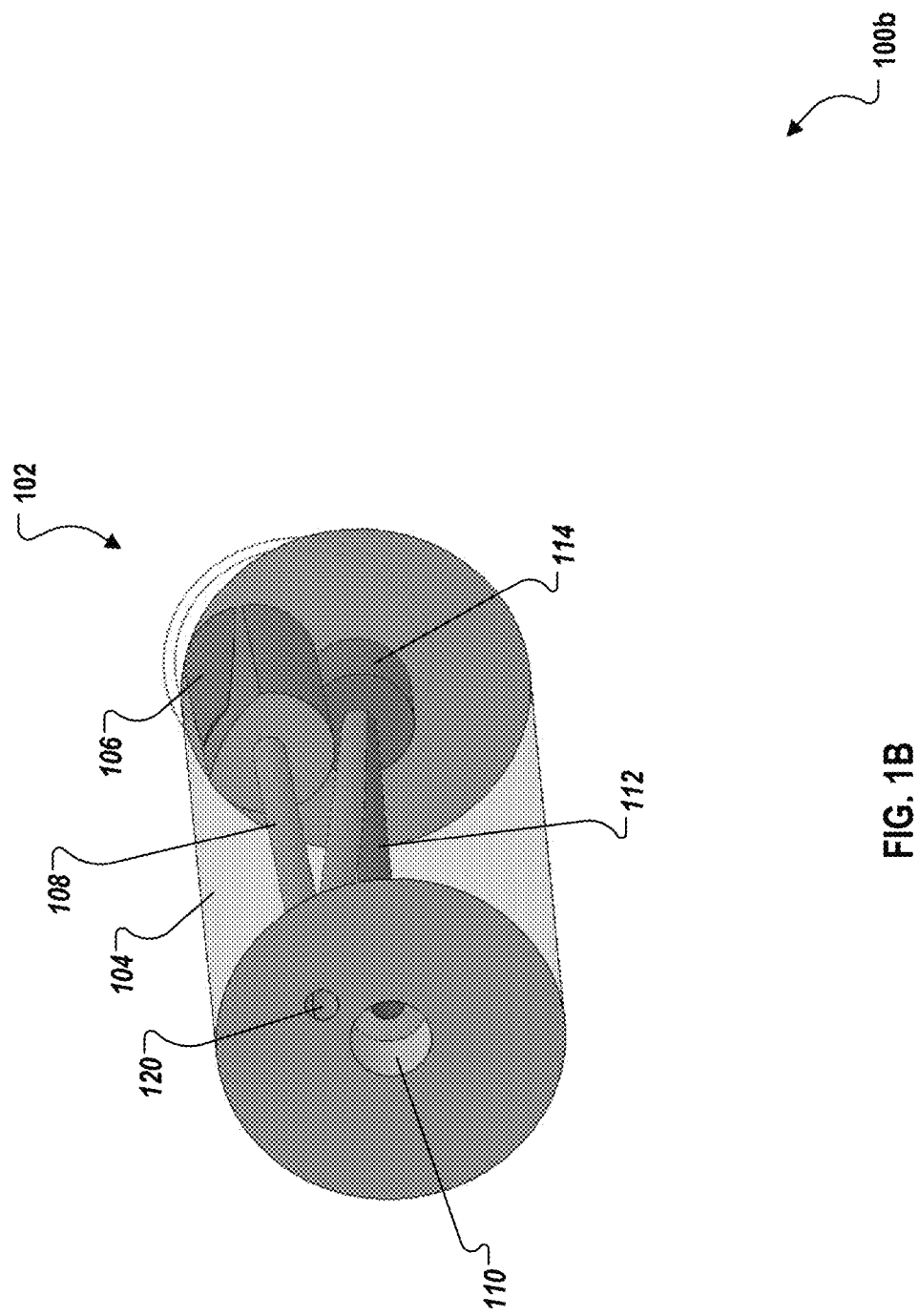
FIG. 1B illustrates a rear perspective view of the first example implementation of an SAOC, according to an implementation.

FIG. 1B illustrates a rear perspective view of the first example implementation (102) of an SAOC according to an implementation. As described above, a reflective surface(s) can be installed at the reflective junction 116 in the emitter channel (e.g., a 45-degree mirror). In some implementations, for example, the housing 104 can be configured with a hole 120 extending into the housing 104 to provide access to the reflective junction 116 of the two segments of the emitter channel 112. Into this hole, a reflective surface (e.g., a mirror) can be placed. In some implementations, a mirror attached to an adjustment post can be inserted into the illustrated hole situated at the reflective junction 116 of the emitter channel 112. The reflective surface can then be oriented using the adjustment post to ensure that the light emitted from the emitter element 110 is properly aligned to travel from the emitter element 110, through both segments of the emitter channel 112 and into the input/output aperture 114. In some implementations, once aligned, the reflective surface can be secured with respect to the housing 104 using an adhesive, fastener, or the like.

Figure 2A:
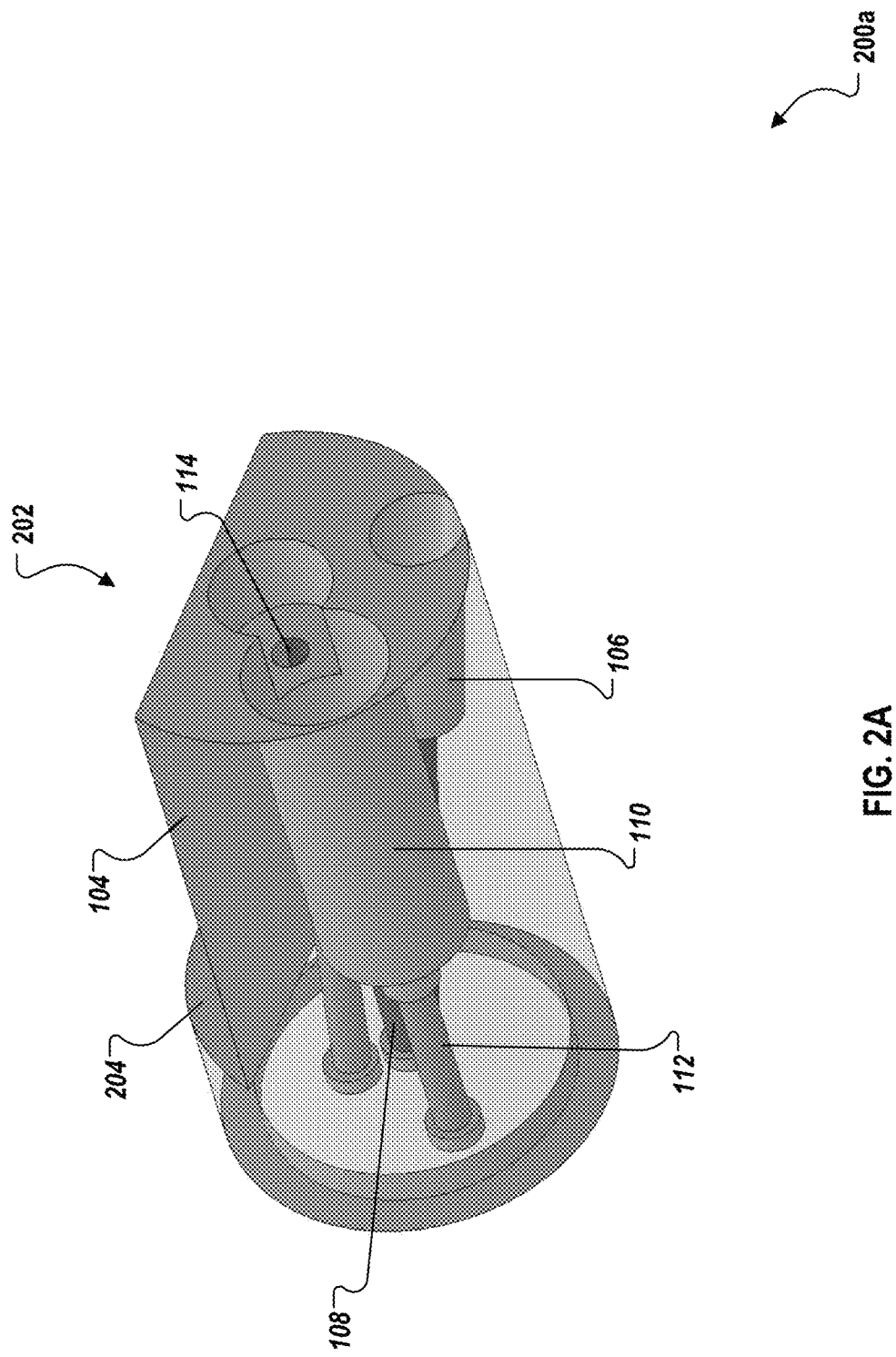
FIG. 2A illustrates a front perspective view of a second example implementation of an SAOC, according to an implementation.

FIG. 2A illustrates a front perspective view 200*a* of a second example implementation (202) of an SAOC according to an implementation. In FIG. 2A, both the emitter element 110 and detector element 106 are configured to point backwards in relation to the input/output aperture 114 (which emits towards the right in FIG. 2A). Both the emitter element 110 and detector element 106 are configured to be installed into/removed from the front of the housing 104. In this implementation, the emitter element 110 is configured to be "on-axis" in relation to the longitudinal axis of the housing 104 (as is the emitter channel 112) while the detector element 106 (and detector channel 108) is off-axis. Each of the emitter channel 112 and detector channel 108 include two segments that are joined with a reflective surface to reflect light along the segments of the corresponding channels (for more, see FIG. 2B). The housing is also configured (e.g., with a cutout/flat surface) to permit the SAOC 202 to possibly fit with (e.g., slide into) a separate component, such as a fitting, casing, electronics package, etc.

Figure 2B:
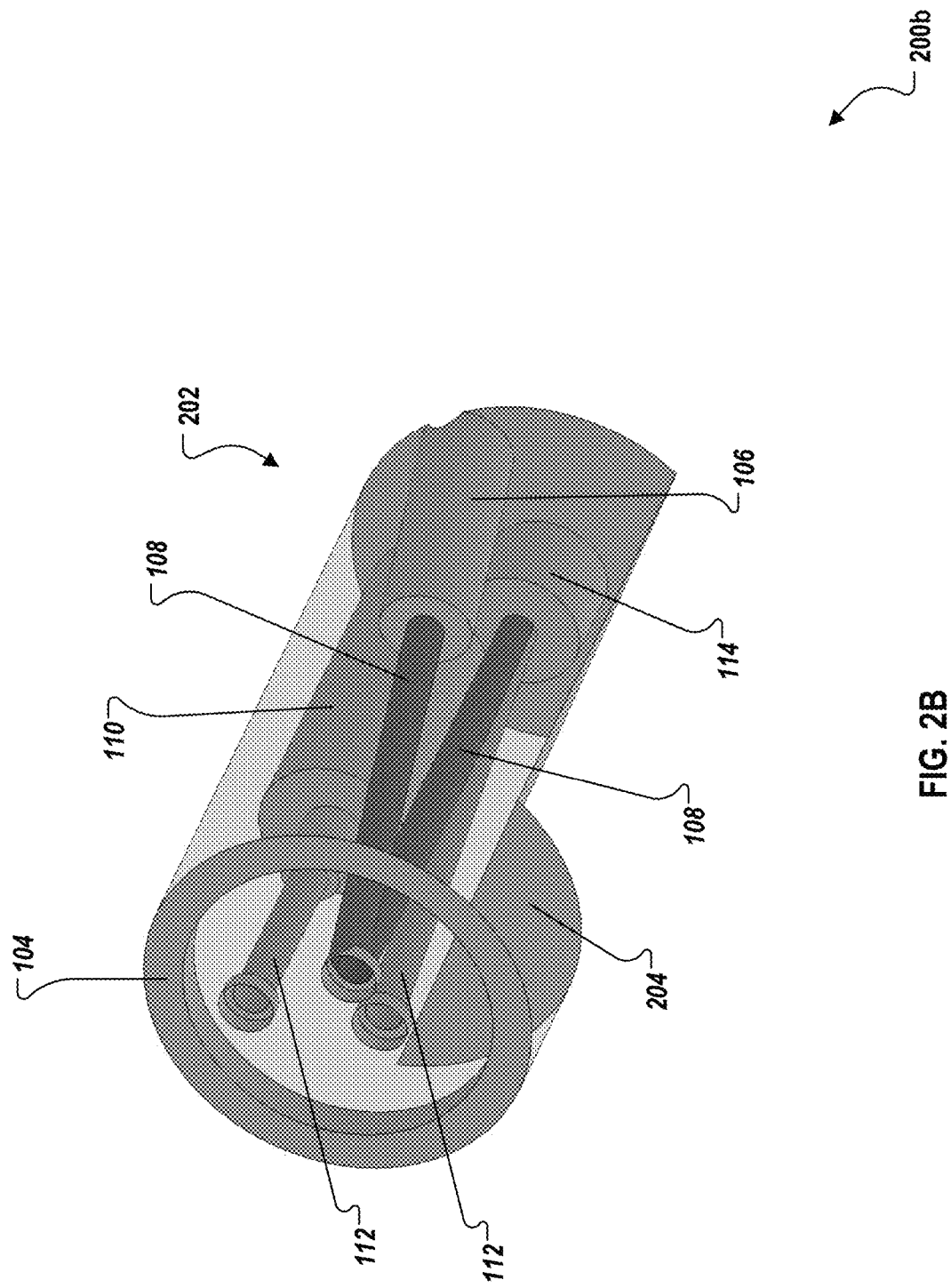
FIG. 2B illustrates a rear perspective view of the second example implementation of an SAOC, according to an implementation.

FIG. 2B illustrates a rear perspective view 200b of the second example implementation (202) of an SAOC according to an implementation. In FIG. 2B, the rear of the SAOC 202 housing is illustrated. For space reasons, the end of the SAOC 202 housing has been sectioned perpendicular to the housing 104 longitudinal axis. As will be understood by those of ordinary skill in the art, emitter channel 112 and detector channel 108 are not shown in their entirety. For example, the two segments of detector channel 108 are configured to meet somewhere to the left of the illustration 200b at a reflective junction where a reflective surface will be used to reflect light into the detector element 106. Also, the two sections of the emitter channel 112 are shown joined for illustrative purposes only and not to angular scale. In actuality, they are also configured to meet somewhere to the left of the illustration 200b at a reflective junction where a reflective surface will be used to reflect light toward the input/output aperture 114.

Figure 3A:
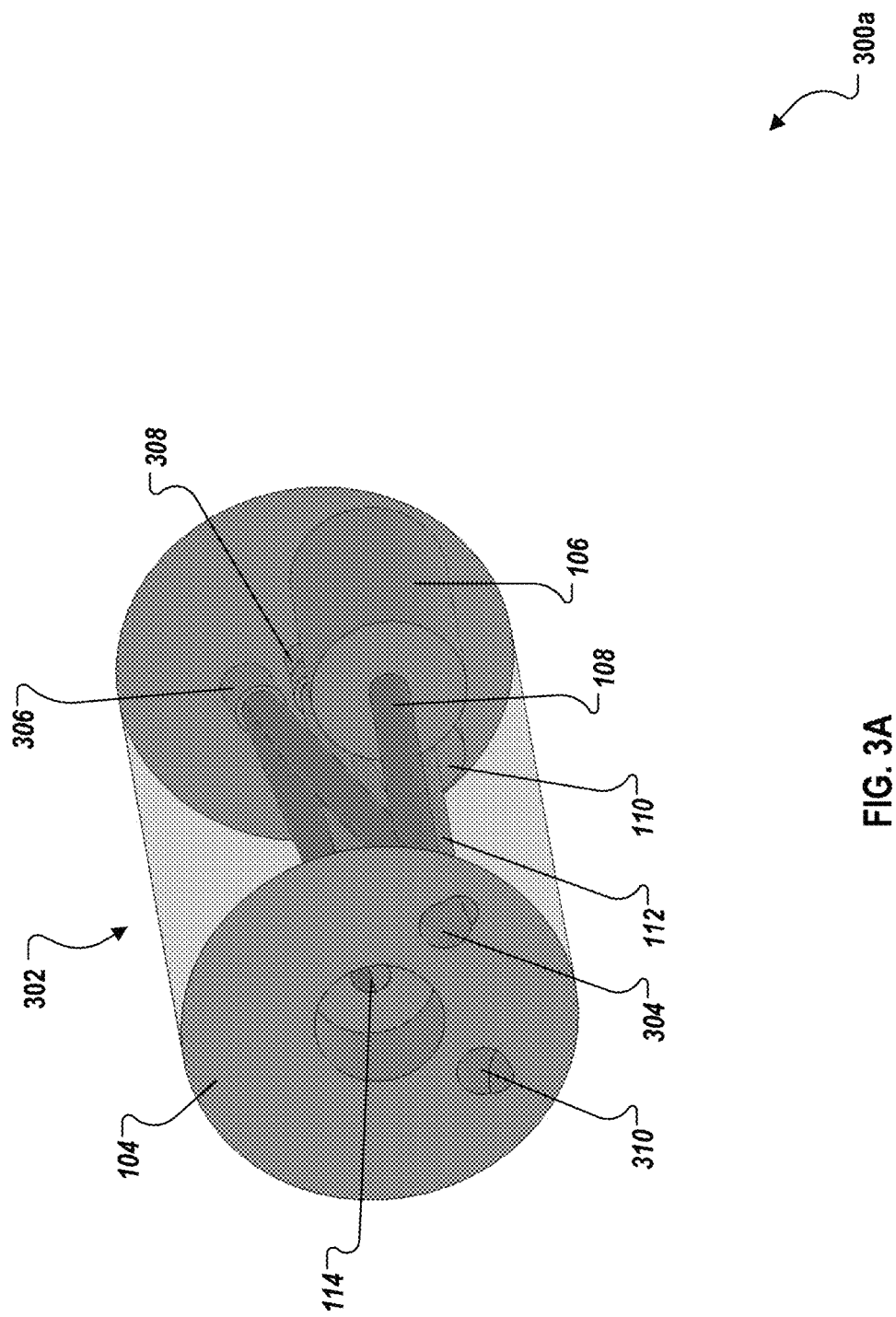
FIG. 3A illustrates a front perspective view of a third example implementation of an SAOC, according to an implementation.

FIG. 3A illustrates a front perspective view 300a of a third example implementation (302) of an SAOC according to an implementation. In FIG. 3A, both the emitter element 110 and the detector element 106 are configured to point forwards in relation to the input/output aperture 114 (all three point towards the left in FIG. 3A). Both the emitter element 110 and detector element 106 are configured to be installed into/removed from the rear of the housing 104. In this implementation, both the emitter element 110 and the detector element 106 are configured to be "on-axis" in relation to the longitudinal axis of the housing 104 and the emitter channel is on-axis with respect to the longitudinal axis of the circulator 302 (while the detector channel 108 is off-axis). Each of the emitter channel 112 and detector channel 108 include three segments that are joined with a reflective surfaces at reflective junctions to reflect light along the segments of the corresponding channels (for more, see FIG. 3B). For example, in the implementation illustrated in FIG. 3A, light from the emitter element 110 is reflected within the emitter channel 112 by reflective surface 304, travels toward reflective surface 306, and then reflected out of the input/output aperture 114. Light received at the input/output aperture 114 is guided down detector channel 108 toward reflective surface 308, reflected toward reflective surface 310, and then reflected into the detector element 106.

Figure 3B:
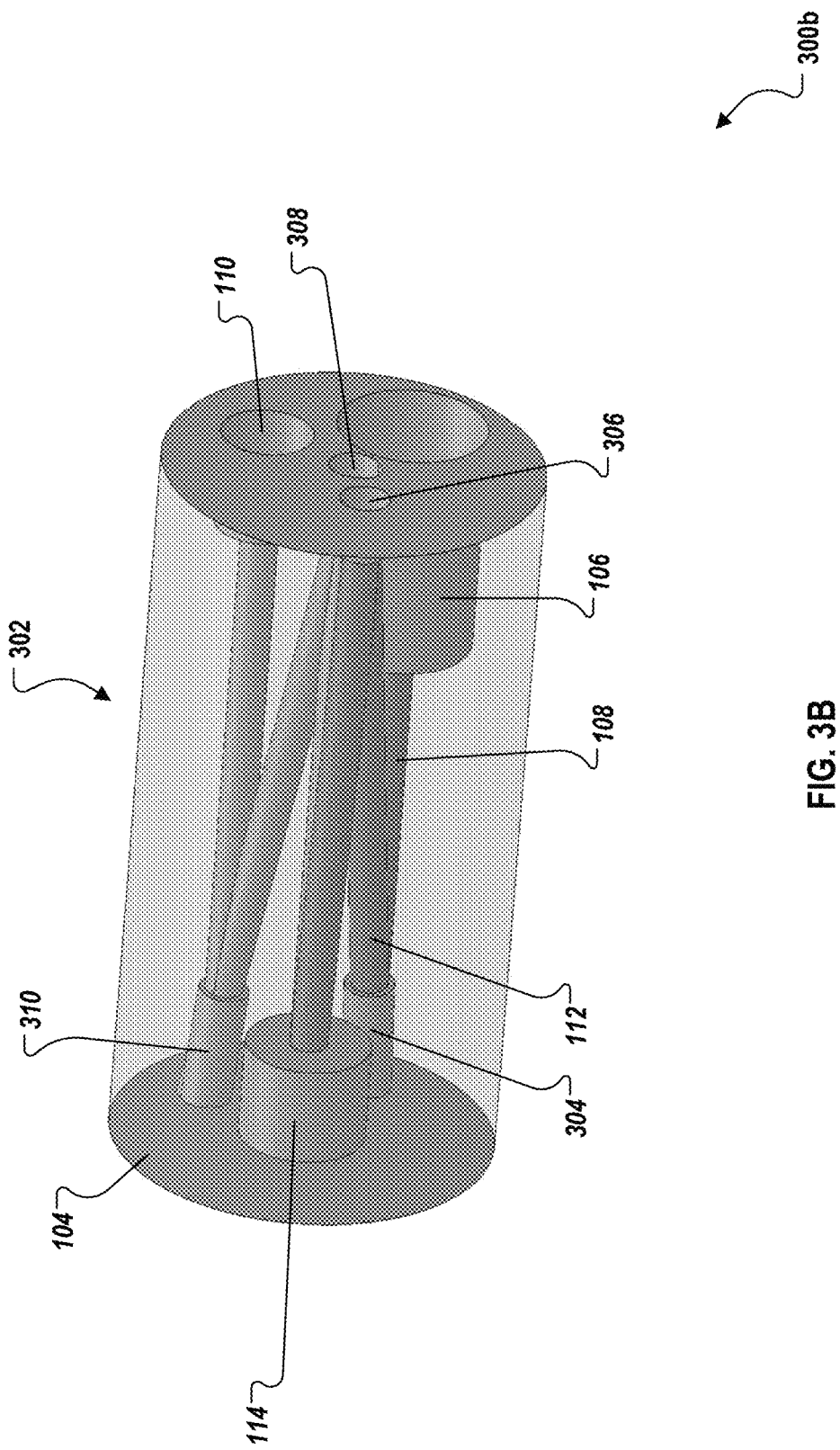
FIG. 3B illustrates a rear perspective view of the third example implementation of an SAOC, according to an implementation.

FIG. 3B illustrates a rear perspective view 300b of the third example implementation (302) of an SAOC according to an implementation. The geometry of the emitter channel 112 segments and the detector channel 108 segments in relation to other components of the SAOC 302 are illustrated from a different perspective.

Figure 4A:
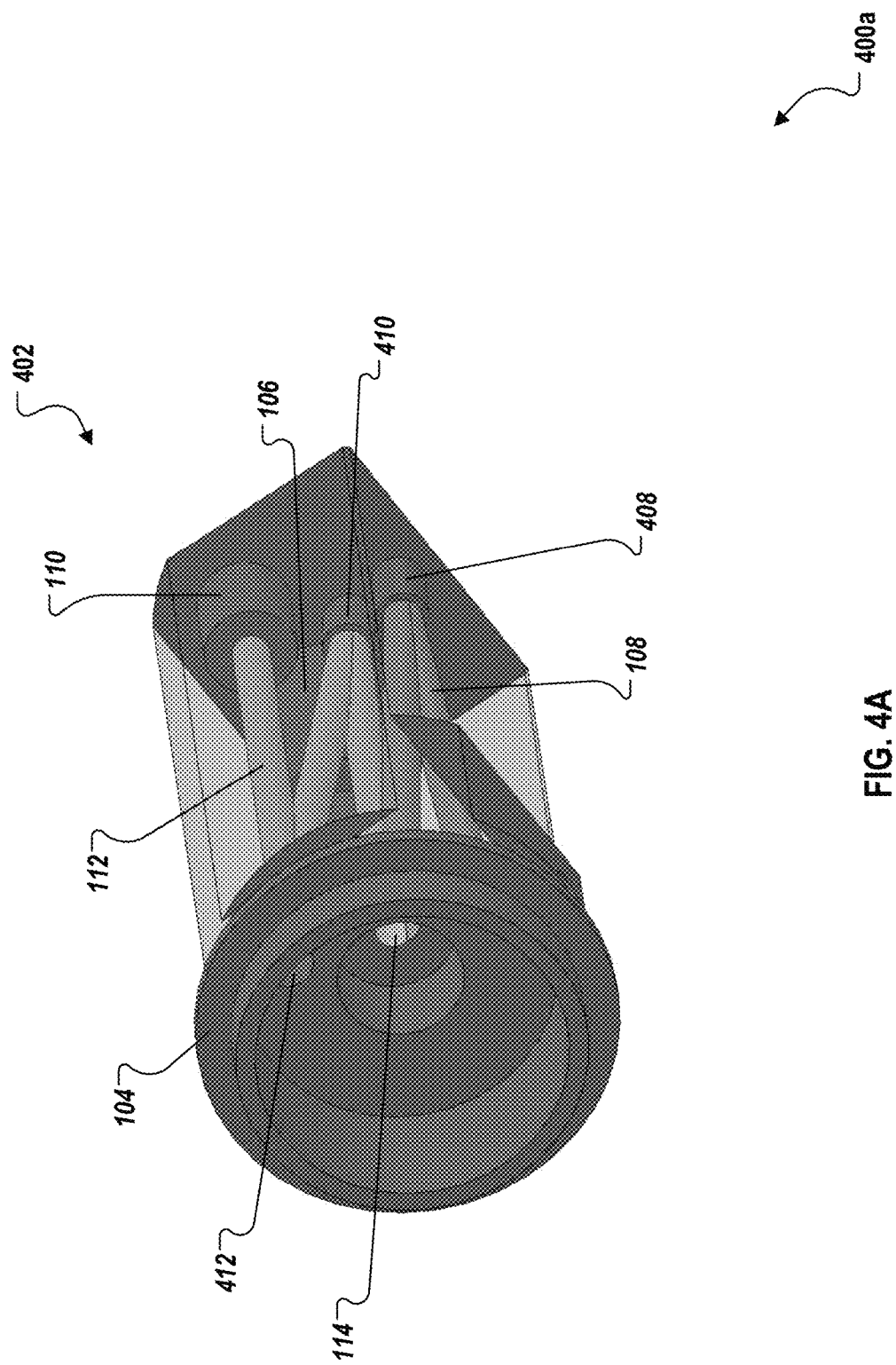
FIG. 4A illustrates a front perspective view of a fourth example implementation of an SAOC, according to an implementation.

FIG. 4A illustrates a front perspective view 400a of a fourth example implementation (402) of an SAOC according to an implementation. In FIG. 4A, both the emitter element 110 and the detector element 106 are configured to point forwards in relation to the input/output aperture 114 (all three point towards the left in FIG. 4A). Both the emitter element 110 and detector element 106 are configured to be installed into/removed from the rear of the housing 104. In this implementation, both the emitter element 110 and the detector element 106 are configured to be "on-axis" in relation to the longitudinal axis of the housing 104 and the emitter channel is on-axis with respect to the longitudinal axis of the circulator 302 (while the detector channel 108 is off-axis). Each of the emitter channel 112 and detector channel 108 include multiple segments that are joined/coupled with a reflective surface(s) at each reflective junction to reflect light along the different segments of the corresponding channels (for more, see FIG. 4B). For example, in the implementation illustrated in FIG. 4A, light from the emitter element 110 is reflected within the emitter channel 112 by reflective surface 404 (not illustrated), travels toward reflective surface 406 (not illustrated), reflected to reflective surface 408, and then reflected out of the input/output aperture 114. Light received at the input/output aperture 114 is guided down detector channel 108 toward reflective surface 410, reflected toward reflective surface 412, and then reflected into the detector element 106.

Figure 4B:
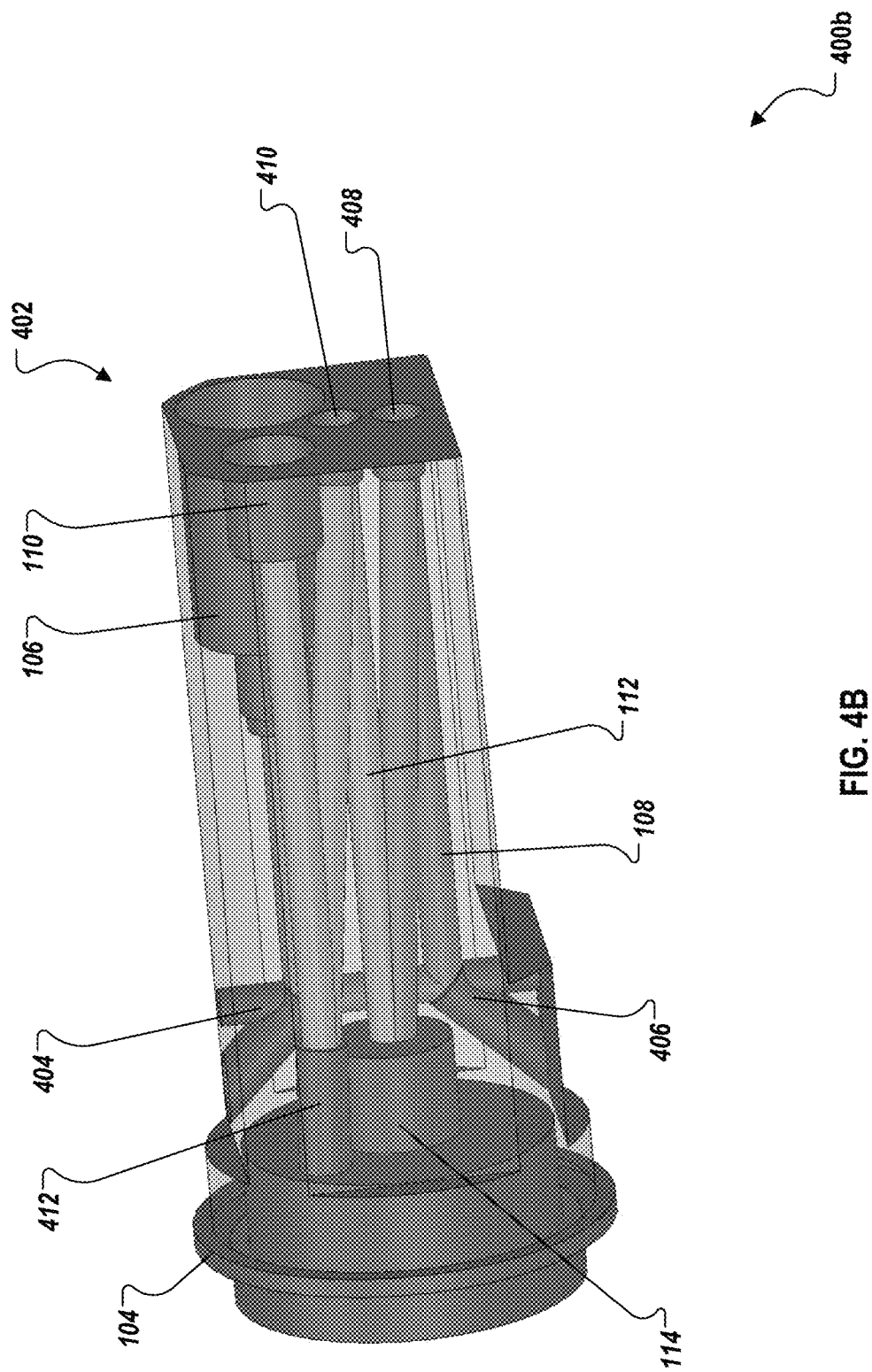
FIG. 4B illustrates a rear perspective view of the fourth example implementation of an SAOC, according to an implementation.

FIG. 4B illustrates a rear perspective view 400b of the fourth example implementation (402) of an SAOC according to an implementation. As can be seen in FIG. 4B, emitter channel 112 is configured with reflective surfaces to perform three reflections (including two ninety-degree angles and a forty-five-degree angle). In some implementations, reflective surface(s) 404 and 406 can contain multiple reflective surfaces (e.g., a ninety-degree and a forty-five-degree angle reflector) to reflect the emitted light around a ninety-degree angle. In this implementation, each reflective surface can be separately installed and aligned as described above with respect to FIG. 1B.

As illustrated by the prior four example implementations, the geometry of the various components of an implementation of an SAOC can vary, for example, depending position/orientation of the emitter element 110 and/or the detector element 106 in relation to the input/output aperture 114. Also, the desired diameter, width, shape, and/or other characteristics of the SAOC (e.g., intended use, need to couple with other components, etc.) can result in varying geometry. Other possible configurations consistent with this disclosure are also envisioned and considered to be within the scope of this disclosure. For example, in some alternative implementations, the emitter element 110 and the detector element 106 (and corresponding uses of the illustrated channels) can be swapped in the above-described implementations. A change in the NROE and/or associated optical/other components (e.g., orientation, configuration, etc.) can permit light to be properly guided to the detector channel 108 on return to the input/output aperture 114.

Note that while the above-described SAOC has been describe in relation to emitting/detecting optical light, in other implementations, the SAOC could also be used to detect other frequencies of light (e.g., X-ray, radio frequencies, gamma rays, and the like). The described subject matter is not intended to be limited to use with only optical light.

The foregoing description of an SAOC is provided in the context of one or more particular implementations. Various modifications, alterations, and permutations of the disclosed implementations can be made without departing from the scope of the disclosure. For example, although the foregoing optical circulator has been described in terms four possible implementations, as will be appreciated by those skilled in the art, the optical circulator can also be configured in other a manner consistent with this disclosure. In addition, although the optical circulator has been illustrated generally in a cylindrical shape, in other particular implementation, as will be appreciated by those skilled in the art, the optical circulator can be configured to be any shape consistent with the principles disclosed. Thus, the present disclosure is not intended to be limited only to the described and/or illustrated implementations, but is to be accorded the widest scope consistent with the principles and features disclosed herein.

FIG. 5A is a block diagram illustrating an example implementation of a SALRF 500a, according to an implementation. The SALRF 500a includes an SAOC 502 (e.g., as described above—for example, SAOC 102) a matching lens 504, and an input aperture lens 506. The SAOC 502, in some implementations, can be considered to be similarly configured and to operate in a similar manner as on one or more of the above-described SAOC implementations. Note that the SAOC 502 is illustrated with a dump channel as described above. In some implementations, the dump channel can be omitted from the SAOC 502.

In this implementation, the matching lens 504 collimates the light either emitted or received by the SAOC 502. For example, in some implementations, the matching lens 504 can have a focal length of 1-2 mm and allows generation of an approximate 1 mm (0.5-1.0 mm) collimated optical beam output and an approximate 1.0 mm beam over a detector area of about 150 microns on the detector element 106. The matching lens 504 is typically mounted over the light gating mechanism described above (e.g., NROE 508). In typical implementations, the matching lens 504 is configured of plastic or glass, but could be any substance depending on the operational characteristics of the SALRF 500. For example, the matching lens 504 could also be configured of Germanium (Ge), quartz, AMTIER, barium fluoride, calcium fluoride, sodium chloride, CLEARTRAN, fused silica, silicon, polyethylene, IR transparent ceramics, and/or any other type of appropriate substance with which to manufacture a lens.

The input aperture lens 506 is used as a beam "extender" on output and a beam "reducer" on input. For example, a laser beam emitted from the input/output aperture 114, passes the matching lens 504 and is approximately 1.0 mm in diameter. The input aperture lens 506 extends/expands the diameter of the laser beam to provide a wider laser beam with which to hit a target, enhance overall eye safety, etc. When a reflected laser beam enters the input aperture of the SALRF 502, the input aperture lens 506 reduces the laser beam diameter prior to influence by the matching lens 504 (which typically collimates the beam to about 1.0 mm). In typical implementations, the input aperture lens is configured of plastic or glass, but could be any substance depending on the operational characteristics of the SALRF 500. For example, the input aperture lens 506 could also be configured of Germanium (Ge), quartz, AMTIER, barium fluoride, calcium fluoride, sodium chloride, CLEARTRAN, fused silica, silicon, polyethylene, IR transparent ceramics, and/or any other type of appropriate substance with which to manufacture a lens.

FIB. 5B is a block diagram of an example implementation of a non-reciprocal optical element (NROE) 500b used in the above-described optical circulator for use with single aperture optical devices (SAOC), according to an implementation. For example, in some implementations, the NROE 508 can be a photonic-type crystal 510 (e.g., a magneto-optical garnet) operating as a Faraday rotator (either used in a polarization-dependent or -independent optical circulator) that can be used to guide/influence the propagation of the received light to only enter the detector channel 108. For example, in an implementation, a polarization-dependent optical circulator (or Faraday isolator) is made of three parts, an input polarizer 512a (e.g., polarized vertically), a Faraday rotator 510, and an output polarizer 512a, called an analyzer (e.g., polarized at 45°). In an implementation, a polarization-independent optical circulator is made of three parts, an input birefringent wedge 512a (e.g., with its ordinary polarization direction vertical and its extraordinary polarization direction horizontal), a Faraday rotator 510, and an output birefringent wedge 512b (e.g., with its ordinary polarization direction at 45°, and its extraordinary polarization direction at)—45°. Faraday rotator 510 provides non-reciprocal rotation while maintaining linear polarization. That is, the polarization rotation due to the Faraday rotator is always in the same relative direction. In the forward direction, the rotation is positive 45°. In the reverse direction, the rotation is −45°. This is due to the change in a relative magnetic field direction, positive one way, negative the other. This then adds to a total of 90° when the light travels in the forward direction and then the negative direction. This allows higher that typical isolation to be achieved. In some implementations, magnetic fields are not necessary for the described SALRF. In typical operation, the implemented faraday rotator with provided power/magnetic fields can provide isolation or circularization by, e.g., 50-60-70 dB. Without power/magnetic fields, a similar effect with, e.g., 30-40 dB is sufficient for use by the SALRF. In other implementations, as will be appreciated by those of ordinary skill in the art, other sufficient operational characteristics of the described Faraday rotator/optical circulator can be used for proper operation of the SALRF.

FIG. 6A is an exploded diagram 600a of an example SALRF 602 in a front perspective view, according to an implementation. The SALRF 602 includes a beam extender 604 with aperture 606, input aperture lens 506 (not illustrated), matching lens 504 (not illustrated), SAOC 608, electronics end cap 610, detector element 106, and emitter element 110. Also illustrated are various reflective surfaces 612 (e.g., mirrors, prisms, etc.) that are installed/configured into the SAOC 608 housing as described above.

Beam extender 604 transmits light through the aperture 606 in a larger diameter following influence by the input aperture lens 506. Received light is received by the beam extender and projected through the aperture 606 to the input aperture lens 506. In some implementations, the interior surface of the beam extender 604 surrounding the aperture 606 can be reflective or coated with a reflective material. For example, the front of the beam extender 604 can operate in a manner similar to a flashlight reflector to reflect/concentrate light. In some implementations, the beam extender 604 can have a protective cap/lens to provide protection against water, dust, etc. In some other implementations, the beam extender 604 can be some other type of optic (e.g., an afocal lens assembly, etc.).

The SAOC 606 is similar in operation to the example implementations describe above. In the illustrated implementation, the housing of the SAOC 606 is configured with a cutout to allow the electronics cap 610 to slide onto and attach (e.g., clips, friction, tongue and groove, engaged surfaces, etc.) to the SAOC 608. In some implementations, a method of attaching the beam extender 604 to the SAOC 608 (note, sandwiching the input aperture lens 506 and the matching lens 504 between them) is provided. For example, the beam extender 604 could be configured to slide onto the SAOC 608 similar to the electronics cap 610, screw on, clip on, etc.

The electronics end cap 610, provides, in some implementations, a computing engine, display (e.g., OLED, LCD, etc.), memory, data input/output ports (e.g., USB, etc.), radio frequency transmitter/receiver (e.g., WIFI, Bluetooth, etc.), a power source (e.g. a battery and/or power port for connection), speaker, microphone, and/or various instruments (e.g., accelerometer, gyroscope, altimeter, humidity sensor, temperature sensor, atmospheric pressure sensor, clock, etc.). Refer to FIG. 10 for an example computer usable for a typical implementation of one or more elements of the electronics end cap 610. In some implementations, additional data can be transmitted from/received by the electronics end cap 610. For example, a KESTREL (or other type of) atmospheric sensory tool could be used to provide additional data to the SALRF 602. The LCD provides, for example, a projected numerical range to a target when lased by the SALRF 602 (or any other suitable data consistent with this disclosure). Although illustrated as behind the electronics end cap 610, the electronics end cap 610 is typically used to secure the detector element 106 and emitter element 110 in relation to the SAOC 608.

FIG. 6B is an exploded diagram 600b of an example SALRF 602 in a rear perspective view, according to an implementation. In some implementations, the electronics end cap can omit the display and transmit the data to be displayed by a hardlink connection and/or radio frequency to an external display (e.g., a mobile computing device, dedicated display, etc.).

FIGS. 7A & 7B illustrate example implementations 700a & 700b of an assembled SALRF 602 of FIGS. 6A-6B, according to an implementation. As illustrated in FIG. 7A, the SALRF 602 can be configured to have a protective sheath 702 around the described component. A power button/trigger 704 can be configured to activate/deactivate/trigger the SALRF 602. Implementation 700a is also shown with a display integrated into the electronics end cap 610. In contrast, implementation 700b (FIG. 7B) is shown without with a display integrated into the electronics end cap 610. For example, without a display, implementation 700b is intended to connect, transmit, and/or receive data from and external computing device (e.g., a smart device, computer, mobile device, etc.).

FIGS. 8A & 8B illustrate example mounting options for a SALRF 602 of FIGS. 6A-6B and 7, according to an implementation. In FIG. 8A, images 802a and 802b illustrate the SALRF 602 mounted to a binocular in one possible manner (a clamping bracket). Other variations are also envisioned. In some implementations, the SALRF 602 can also be mounted to the hinge or other component of the illustrated binocular. Turning to FIG. 8B, images 804a and 804b illustrate the SALRF 602 coupled with a Picatinny-type rail mount to, for example, clamp onto a Picatinny-type rail provided as part of a mounting platform for a firearm, tripod, etc.

FIG. 9 is an illustration of the SALRF 602 of FIGS. 6A-6B, 7, and 8A-8B mounted to a firearm with a display linked to the SALRF 602 with a data cable, according to an implementation. In this implementation, the SALRF 602 can be provided with ballistics software to provide aiming calculations for the firearm operator (the SALRF can act as a range-finder, ballistics calculator, etc.). In some implementations, the SALRF 602 can perform functions described in above-described co-pending U.S. patent application Ser. No. 13/870,828 (e.g., the detector element acting as a quadrant photodetector and associated functionality) useful for aiming a firearm or any other described functionality.

Multiple Emitter/Detector Implementations

Consistent with the foregoing description, implementations of the described SAOC implementations can be configured to support the use of multiple emitting elements or multiple detector elements. For example, referring to FIG. 5B, two or more emitter elements 110 (e.g., each with a separate emitter channel 112) can be used to emit two different types of light (e.g., wavelength, continuous/pulsed, polarization, etc.) which are merged into a single output path to pass through an NROE 508. Such light sources can have substantially different output parameters. For example one light source can have a high repetition rate, a shorter pulse, and a lower peak power to measure distance to a target accurately and in close proximity to the ranging device. The second light source can have a substantially higher peak power and a lower repetition rate for measuring the range to a more remote target. Alternatively, a non-polarized light source can be used with an optical circulator configured with two detectors to measuring reject paths. These reject paths have orthogonal single-polarization components of the returned signal. The difference in the signal for these two polarization components will indicate the target with polarizing return such as an optical surface placed at an angle into the optical path. In this manner, the detectors will be measuring difference signal between two detectors can be used for detecting targets with a polarization-dependent return. In another configuration the detector is a plurality of the detectors that record the timing of the arriving signal for each detector and allow to record 3D image of the target.

In typical implementations, the angle of the birefringent wedges (e.g., 512a & 512b) are increased from typical configurations by a factor of three (e.g., from around 6-degrees to more than 10-degrees, typically around 20-degrees). In typical implementations, by using emitted light at an angle to the axis of the isolator, the merged light is launched on the same path as the detector path (along the detector channel 108) from the reject direction (along emitter channels 112) of the isolator. The NROE 508 changes the direction (angle) of the light propagation differently for transmitted and received signals. For example, the design allows a combination of two light sources with linear polarization in a 90-degree orientation to each other to be combined into a common output optical path that is shared with the detector path.

FIG. 10 is a block diagram of a multi-emitter SALRF 1000, according to an implementation. SALRF 1000 includes a SAOC 1002, optics 1004 (e.g., matching lens 504 and input aperture lens 506 of FIG. 5), two emitter elements 1006a/b (e.g., emitter elements 112a/b), and one detector element 1008 (e.g., detector element 108). The SAOC 1002 includes both a merging/splitting optical component 1012 and an NROE 1014 (e.g., NROE 508 of FIGS. 5A & 5B) to merge/split outgoing/incoming light. In typical implementations (including that of FIG. 11), merging/splitting optical component 1012 can be one or more of a beam splitter, mirror, another SAOC, and the like.

For example, simultaneously, emitter element 1 1006a can emit a green laser and emitter element 2 1006b can emit an infrared laser. When lasing target 1010, emitted light 1016a and 1016b are merged by the merging/splitting optical component 1012 and the NROE 1014 configured to allow the combined light to pass through together toward the target 1010. The reflected light of each frequency is received back at the NROE 1004 and directed toward the detector element 1008.

In some implementations, the returning combined light can bypass the merging/splitting optical component 1012 and proceed directly to the single detector element 1008 (which can be configured to detect more than one type of light). Although not illustrated, in other implementations, the returning light can be processed by the merging/splitting optical component 1012 and split back into two separate types of light (i.e., green laser and infrared laser) to be directed to two or more detector elements 1008 for detection of each type of light. In some implementations, each emitter element can be activated individually and the circulator 1002 can flip the NROE 1014 between emitter and receiving modes for each emitted light type.

FIG. 11 is a block diagram of a multi-detector SALRF 1100, according to an implementation. SALRF 1100 includes a SAOC 1102, optics 1104 (e.g., matching lens 504 and input aperture lens 506 of FIG. 5), two detector elements 1106a/b (e.g., detector elements 108a/b), and one emitter element 1008 (e.g., emitter element 112). The SAOC 1102 includes both a merging/splitting optical component 1112 and an NROE 1114 (e.g., NROE 508 of FIGS. 5A & 5B) to merge/split outgoing/incoming light. In typical implementations, merging/splitting optical component 1112 can be one or more of a beam splitter, fiber, mirror, another SAOC, and the like.

For example, emitter element 1108 can emit two different frequencies/polarizations of light (e.g., a green laser and an infrared laser). In some implementations, the emitted light can be configured to bypass the merging/splitting optical component 1112 and proceed directly to NROE 1114. In other implementations the merged light can be passed through the merging/splitting optical component 1112. When lasing target 1110, emitted light 1120 is reflected off target 1110 as returning light 1118 and passed through the NROE 1114 to the merging/splitting optical component 1112. The returning light 1118 can be processed by the merging/splitting optical component 1012 and split back into two separate types of light (i.e., green laser and infrared laser) to be directed to the two detector elements 1106a/b for detection of each type of light.

As will be understood by those of ordinary skill in the art, consistent with the prior-described implementations, in other implementations, a dual emitter element, dual detector element SALRF can be configured using a combination (e.g., operating in series and/or parallel) of merging/splitting optical components to properly merge/direct light within the SAOC to appropriate emitter/detector elements. Other configurations of a SALRF are also possible which include more than two emitter and/or detector elements. These other configurations are considered to be within the scope of this disclosure.

In other implementations, multiple NROE components can be placed into series and/or parallel after NROE 1014/1114 or in a single-detector element/emitter element implementation. In this way, for example, multiple light source types can be emitted from circulator 1002/1102 and directed at various angles using activations (e.g., magnetic field, electric, etc.) of the various NROE components. In this way, a target can be "scanned" by being painted in different with light sources (either the same or different), and then the returned light can be directed to an appropriate detector element for analysis. The multiple NROE components can be treated as a multiple-bit, addressable machine to direct emitted light/receive returned light by flipping ON/OFF individual NROE elements. An addressable selection system (e.g., a computer system, logic board, etc.) can be coupled to the multiple NROE components and used to individually activate/deactivate each of the multiple NROE components. selection Examples of use can include a projection system (e.g., red, green, blue), object scanning system for 3D scanning in single/multiple light wavelengths, topographical scanner, multiple target scanner (e.g., tied to a computerized targeting system that can direct the SALRF to target various targets at different angles using the multiple NROE elements), an adjustable SALRF depending on atmospheric conditions (e.g., varying light types based on weather conditions), a stationary ranging system that can remain stationary and scan a moving target by adjusting the angle of emitted light as the target moves, and other uses consistent with this disclosure.

FIG. 12 is a block diagram of an exemplary computer system 1200 used to provide functionality related to the described SALRF, according to an implementation. The illustrated computer 1202 is intended to encompass any computing device such as a server, desktop computer, laptop/notebook computer, wireless data port, smart phone, personal data assistant (PDA), tablet computing device, one or more processors within these devices, or any other suitable processing device, including both physical and/or virtual instances of the computing device. Additionally, the computer 1202 may comprise a computer that includes an input device, such as a keypad, keyboard, touch screen, or other device that can accept user information, and an output device that conveys information associated with the operation of the computer 1202, including digital data, visual and/or audio information, or a GUI.

The computer 1202 can serve as a client, network component, a server, a database or other persistency, and/or any other component of a computer system to provide functionality related to the described SALRF. The illustrated computer 1202 is communicably coupled with a network 1230. In some implementations, one or more components of the computer 1202 may be configured to operate within a cloud-computing-based, local, global, and/or other environment.

At a high level, the computer 1202 is an electronic computing device operable to receive, transmit, process, store, or manage data and information associated with functionality related to the described SALRF. According to some implementations, the computer 1202 may also include or be communicably coupled with an application server, e-mail server, web server, caching server, streaming data server, and/or other server.

The computer 1202 can receive requests over network 1230 from a client application (e.g., executing on another computer 1202) and responding to the received requests by processing the said requests in an appropriate software application. In addition, requests may also be sent to the computer 1202 from internal users (e.g., from a command console or by other appropriate access method), external or third-parties, other automated applications, as well as any other appropriate entities, individuals, systems, or computers.

Each of the components of the computer 1202 can communicate using a system bus 203. In some implementations, any and/or all the components of the computer 202, both hardware and/or software, may interface with each other and/or the interface 1204 over the system bus 1203 using an application programming interface (API) 1212 and/or a service layer 1213. The API 1212 may include specifications for routines, data structures, and object classes. The API 1212 may be either computer-language independent or dependent and refer to a complete interface, a single function, or even a set of APIs. The service layer 1213 provides software services to the computer 1202 and/or other components (whether or not illustrated) that are communicably coupled to the computer 1202. The functionality of the computer 1202 may be accessible for all service consumers using this service layer. Software services, such as those provided by the service layer 1213, provide reusable, defined functionalities through a defined interface. For example, the interface may be software written in JAVA, C++, or other suitable language providing data in extensible markup language (XML) format or other suitable format. While illustrated as an integrated component of the computer 1202, alternative implementations may illustrate the API 1212 and/or the service layer 1213 as stand-alone components in relation to other components of the computer 1202 and/or other components (whether or not illustrated) that are communicably coupled to the computer 1202. Moreover, any or all parts of the API 1212 and/or the service layer 1213 may be implemented as child or sub-modules of another software module, enterprise application, or hardware module without departing from the scope of this disclosure.

The computer 202 includes an interface 1204. Although illustrated as a single interface 1204 in FIG. 12, two or more interfaces 1204 may be used according to particular needs, desires, or particular implementations of the computer 1202 and/or functionality related to the described SALRF. The interface 1204 is used by the computer 1202 for communicating with other systems in a distributed environment that are connected to the network 1230 (whether illustrated or not). Generally, the interface 1204 comprises logic encoded in software and/or hardware in a suitable combination and operable to communicate with the network 1230. More specifically, the interface 1204 may comprise software supporting one or more communication protocols associated with communications such that the network 1230 or interface's hardware is operable to communicate physical signals within and outside of the illustrated computer 1202.

The computer 1202 includes a processor 1205. Although illustrated as a single processor 1205 in FIG. 12, two or more processors may be used according to particular needs, desires, or particular implementations of the computer 1202. Generally, the processor 1205 executes instructions and manipulates data to perform the operations of the computer 1202. Specifically, the processor 1205 executes the functionality related to the described SALRF.

The computer 1202 also includes a memory 1206 that holds data for the computer 1202 and/or other components that can be connected to the network 1230 (whether illustrated or not). For example, memory 1206 can be a database storing data consistent with this disclosure. Although illustrated as a single memory 1206 in FIG. 12, two or more memories may be used according to particular needs, desires, or particular implementations of the computer 1202 and functionality to provide real-time parking information. While memory 1206 is illustrated as an integral component of the computer 1202, in alternative implementations, memory 1206 can be external to the computer 1202.

The application 1207 is an algorithmic software engine providing functionality according to particular needs, desires, or particular implementations of the computer 1202, particularly with respect to functionality required for providing functionality related to the described SALRF. For example, application 1207 can serve as one or more components, modules, applications, etc. Further, although illustrated as a single application 1207, the application 1207 may be implemented as multiple applications 1207 on the computer 1202. In addition, although illustrated as integral to the computer 1202, in alternative implementations, the application 1207 can be external to the computer 1202.

There may be any number of computers 1202 associated with, or external to, a computer system containing computer 1202, each computer 1202 communicating over network 1230. Further, the term "client," "user," and other appropriate terminology may be used interchangeably as appropriate without departing from the scope of this disclosure. Moreover, this disclosure contemplates that many users may use one computer 1202, or that one user may use multiple computers 1202.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and/or parallel processing may be advantageous and performed as deemed appropriate.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be equally applicable (where appropriate) to at least a computer-implemented method; a non-transitory, computer-readable medium storing computer-readable instructions to perform the computer-implemented method; and/or a computer system comprising a computer memory interoperably coupled with a hardware processor configured to perform the computer-implemented method and/or the instructions stored on the non-transitory, computer-readable medium.

The invention claimed is:

1. A single aperture laser range finder, comprising:
   a beam expander comprising:
      a first aperture;
      an input aperture lens configured to expand beams of light transmitted from the single aperture laser range finder, and reduce beams of light received by the single aperture laser range finder; and
      a matching lens that collimates light leaving the beam expander;
   a single aperture optical circulator comprising:
      a non-fiber emitter channel associated with an emitter element and a non-fiber detector channel associated with a first detector element, wherein the non-fiber emitter channel and the non-fiber detector channel merge together at an input/output aperture;
      a non-reciprocating optical element configured to permit, as received light, light received from the matching lens to enter the non-fiber detector channel but to prevent the received light from entering the non-fiber emitter channel; and
      an additional non-reciprocating optical element following the input/output aperture in order to direct the light emitted from the emitter element and to direct the received light into the input/output aperture.

2. The single aperture laser range finder of claim 1, wherein the first detector element is a quadrant photodetector.

3. The single aperture laser range finder of claim 1, comprising an additional emitter element and optical component within the single aperture optical circulator to merge emitted light of the additional emitter element prior to entry into the non-reciprocating optical element.

4. The single aperture laser range finder of claim 3, wherein the emitter element and the additional emitter element are each configured to emit a different particular wavelength of light.

5. The single aperture laser range finder of claim 1, comprising a second detector element, wherein the first detector element and the second detector element are each associated with a different particular wavelength of light.

6. The single aperture laser range finder of claim 1, comprising an addressable selection system for individually activating or deactivating each of a plurality of additional non-reciprocating optical elements.

7. A method comprising:
   emitting, as emitted light, light from a single aperture optical circulator;
   collimating, as collimated light, the emitted light using a matching lens;
   extending, as extended light, the collimated light using a beam expander;
   projecting the extended light toward a target;
   receiving, from the target and as received light, reflected light from the target at the beam expander;
   directing the emitted light and directing received light into an input/output aperture with a first non-reciprocating optical element following the input/output aperture;
   reducing, as reduced light, the reflected light for transmission to the matching lens;
   collimating the reduced light for entry into a second non-reciprocating optical element configured to permit, as received light, light received from the matching lens to enter a non-fiber detector channel but to prevent the received light from entering a non-fiber emitter channel; and
   detecting the received light, as detected light, by a detector associated with the non-fiber detector channel; and
   displaying data associated with detected light.

8. The method of claim 7, wherein the detector is a quadrant photodetector.

9. The method of claim 7, wherein the single aperture optical circulator comprises an emitter and optical component within the single aperture optical circulator to merge light emitted from the emitter prior to entry into the first non-reciprocating optical element.

10. The method of claim 7, wherein the detector is configured to detect a particular wavelength of light.

11. The method of claim 7, wherein the emitted light is a particular wavelength.

* * * * *